(12) United States Patent
Yamamoto et al.

(10) Patent No.: US 11,275,983 B2
(45) Date of Patent: Mar. 15, 2022

(54) RFID TAGS BOARD, RFID TAG AND RFID SYSTEM

(71) Applicant: KYOCERA Corporation, Kyoto (JP)

(72) Inventors: Shuichi Yamamoto, Kirishima (JP); Yoshimasa Sugimoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/957,398

(22) PCT Filed: Dec. 19, 2018

(86) PCT No.: PCT/JP2018/046802
§ 371 (c)(1),
(2) Date: Jun. 24, 2020

(87) PCT Pub. No.: WO2019/131383
PCT Pub. Date: Jul. 4, 2019

(65) Prior Publication Data
US 2020/0327389 A1    Oct. 15, 2020

(30) Foreign Application Priority Data
Dec. 25, 2017 (JP) .............................. JP2017-247891

(51) Int. Cl.
*G06K 19/02* (2006.01)
*G06K 19/077* (2006.01)
*H01Q 13/08* (2006.01)

(52) U.S. Cl.
CPC ....... *G06K 19/07722* (2013.01); *H01Q 13/08* (2013.01)

(58) Field of Classification Search
CPC ............ A61B 5/14532; A61B 5/14865; A61B 5/1473; A61B 5/14546; Y02A 90/10
USPC ........................ 235/487, 488, 462.46, 472.02
See application file for complete search history.

(56) References Cited

U.S. PATENT DOCUMENTS

| | | | |
|---|---|---|---|
| 9,064,198 B2 * | 6/2015 | Kato | G06K 19/07749 |
| 2006/0000915 A1 * | 1/2006 | Kodukula | G06K 19/07756 235/492 |
| 2007/0285335 A1 * | 12/2007 | Bungo | H01Q 21/30 343/895 |

(Continued)

FOREIGN PATENT DOCUMENTS

| | | |
|---|---|---|
| JP | 2008-123196 A | 5/2008 |
| WO | 2007/083574 A1 | 7/2007 |
| WO | 2009/027854 A1 | 3/2009 |

*Primary Examiner* — Daniel St Cyr
(74) *Attorney, Agent, or Firm* — Volpe Koenig

(57) ABSTRACT

An RFID tag board includes a circuit board and a radiation member. The circuit board includes a dielectric substrate, a radiation conductor, a ground conductor, a connection conductor, a first electrode and a second electrode. The dielectric substrate includes a first surface, a second surface and a recess. The second surface is opposite to the first surface, and is a mounting surface to be mounted on an article. The radiation conductor is on the first surface of the dielectric substrate. The ground conductor is on the second surface of the dielectric substrate. The connection conductor electrically connects the radiation conductor and the ground conductor. The first electrode and the second electrode are in the recess. The radiation member is fixed to the first surface of the circuit board.

15 Claims, 21 Drawing Sheets

(56) References Cited

U.S. PATENT DOCUMENTS

| | | | | |
|---|---|---|---|---|
| 2012/0206313 A1* | 8/2012 | Jaakkola | .......... | G06K 19/07749 |
| | | | | 343/793 |
| 2013/0321168 A1* | 12/2013 | Mahony | ................ | A61B 5/318 |
| | | | | 340/870.09 |
| 2014/0247192 A1* | 9/2014 | Ikemoto | ................... | H01Q 7/06 |
| | | | | 343/788 |
| 2017/0249544 A1 | 8/2017 | Ali | | |

* cited by examiner

RFID TAGS BOARD, RFID TAG AND RFID SYSTEM

TECHNICAL FIELD

The present disclosure relates to an RFID (Radio Frequency Identification) tag board, an RFID tag and an RFID system.

BACKGROUND ART

In recent years, contactless information communication means using RFID (Radio Frequency Identification) systems have been widely used as IC (Integrated Circuit) cards for electronic money and tags for inventory control. Information is transmitted and received between these and external devices, such as reader/writers, by radio (RF) communication. The RFID systems include, for example, a system that uses frequencies in the UHF (Ultra High Frequency) band for information communication. UHF RFID tags include a tag in which a semiconductor element, such as an IC for RFID, is mounted on a circuit board as an antenna board having a power supply circuit, and a radiating plate (auxiliary antenna) is bonded to the circuit board or disposed in the vicinity thereof. (See, for example, Patent Literature 1 and Patent Literature 2.) Signals that the RFID system transmits or receives are retrieved or stored by the semiconductor element of the RFID tag, for example.

CITATION LIST

Patent Literature

Patent Literature 1: WO 2007/083574 A1
Patent Literature 2: JP 2008-123196 A

SUMMARY OF INVENTION

An RFID tag board according to an aspect of the present disclosure includes: a circuit board including: a dielectric substrate including: a first surface; a second surface opposite to the first surface, the second surface being a mounting surface to be mounted on an article; and a recess; a radiation conductor on the first surface of the dielectric substrate; a ground conductor on the second surface of the dielectric substrate; a connection conductor electrically connecting the radiation conductor and the ground conductor; and a first electrode and a second electrode in the recess; and a radiation member fixed to the first surface of the circuit board.

An RFID tag according to an aspect of the present disclosure includes: the RFID tag board having the above configuration; and a semiconductor element mounted in the recess of the circuit board of the RFID tag board and connected to the first electrode and the second electrode.

An RFID system according to an aspect of the present disclosure includes: the RFID tag having the above configuration; and a reader/writer including an antenna transmitting and receiving a radio wave to and from the RFID tag.

DESCRIPTION OF EMBODIMENTS

Figure 1:
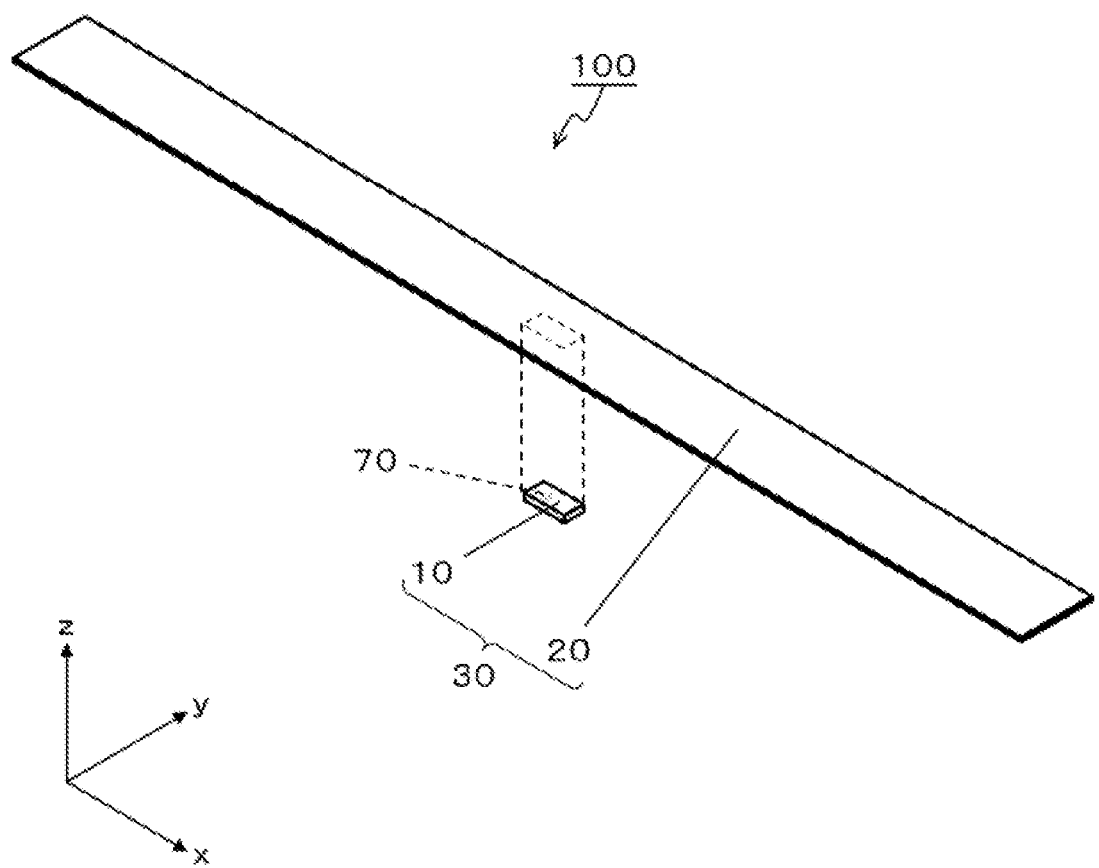
FIG. 1 is an exploded perspective view showing an example of an RFID tag board and an RFID tag.

An RFID tag board, an RFID tag and an RFID system according to an embodiment(s) of the present disclosure will be described with reference to the accompanying drawings. In the drawings, an orthogonal coordinate system xyz fixed and defined with respect to the RFID tag board is added. In the following description, directions may be described with reference to this orthogonal coordinate system. Any direction of the RFID tag could be the vertical direction or the horizontal direction, and the z-axis direction may be referred to as the up-down direction, the height direction or the thickness direction. When "in plan view" is simply stated in relation to the RFID tag, it indicates that the RFID tag is viewed in the z-axis direction. Distinction between "upper" and "lower" or the like in this case is for convenience's sake, and not intended to limit either the upper side or the lower side when a circuit board or the like is actually used.

Figure 2:
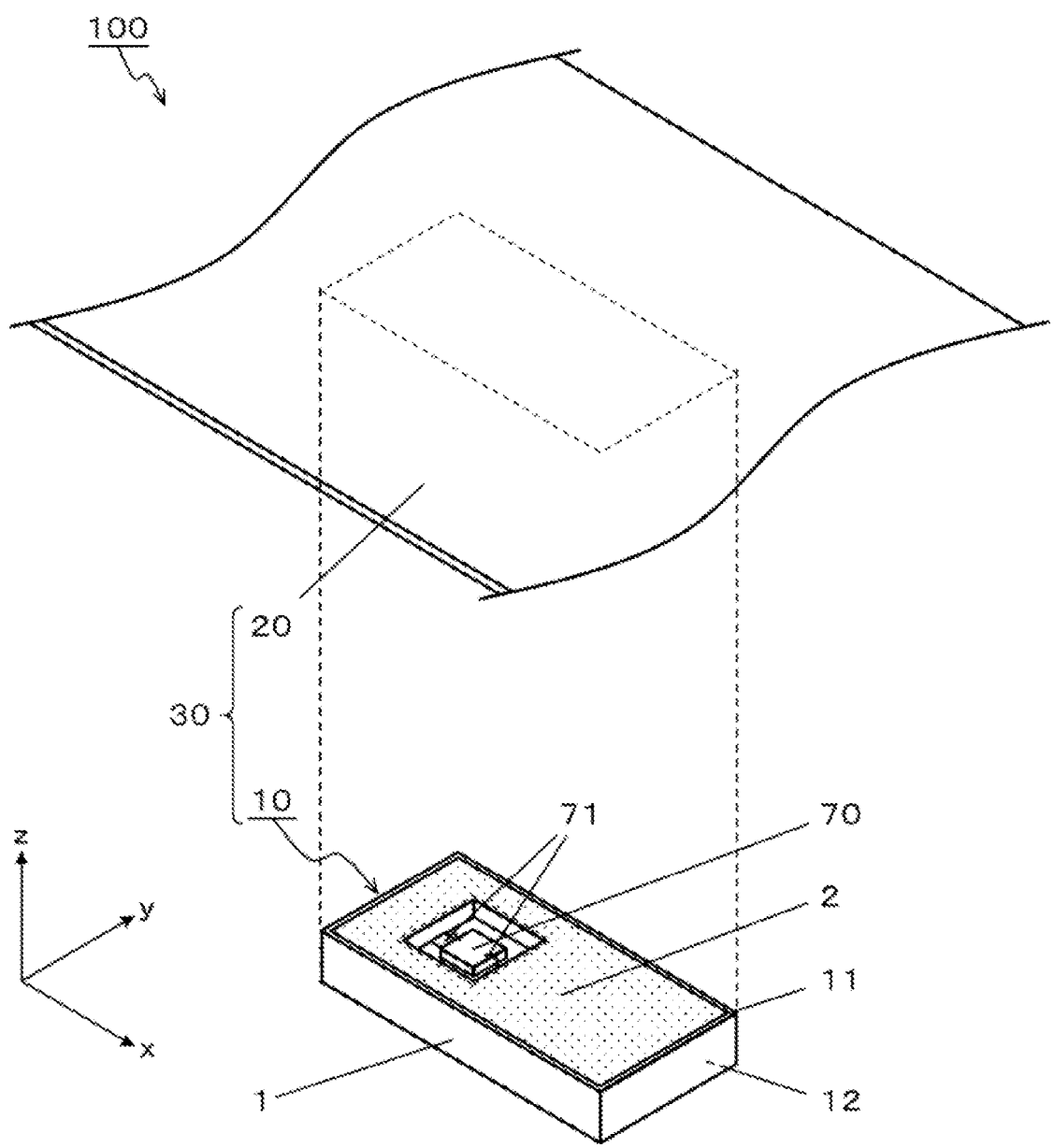
FIG. 2 is an exploded perspective view showing the principle part of the example of the RFID tag board and the RFID tag in an enlarged manner.
Figure 3:
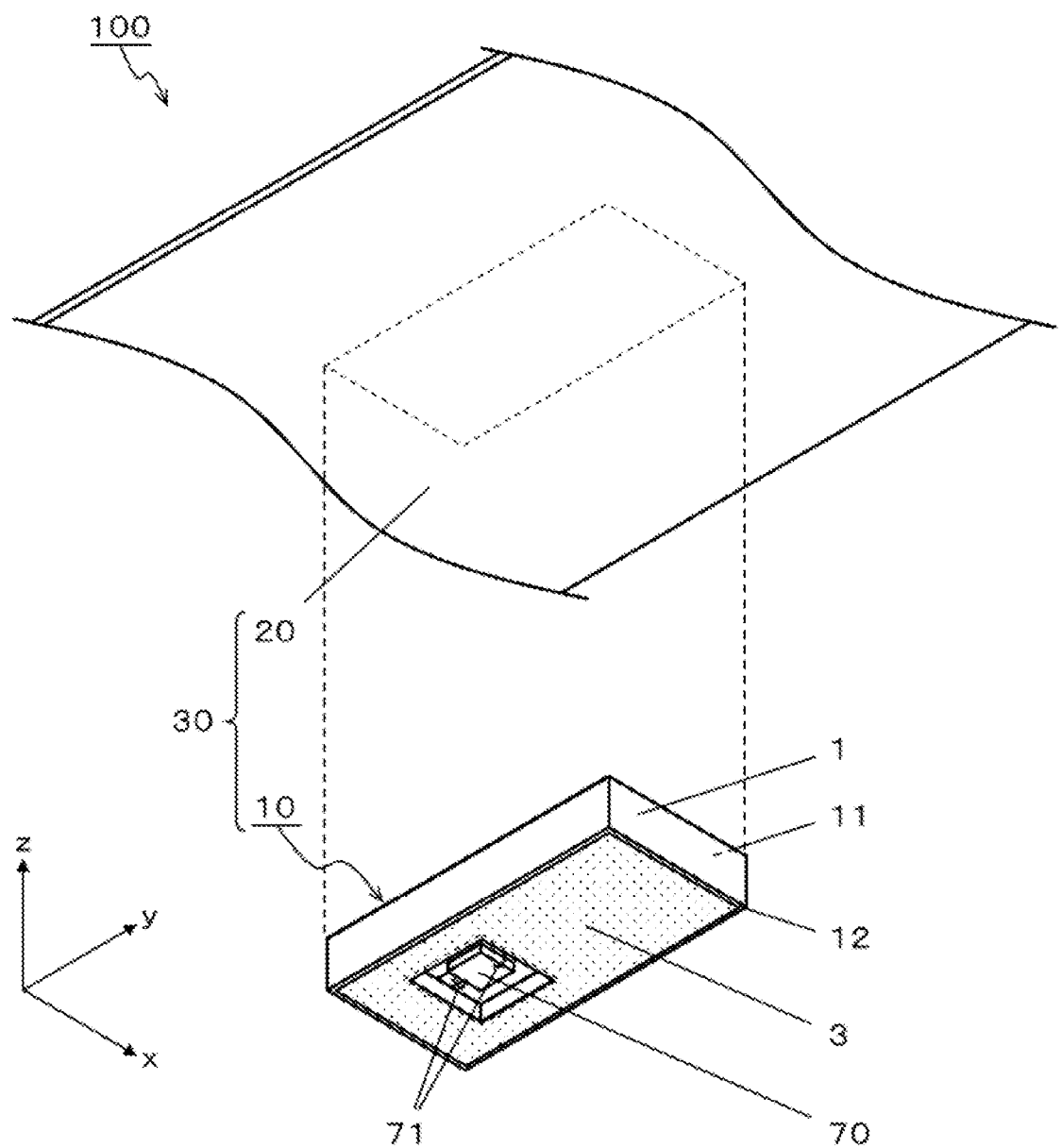
FIG. 3 is an exploded perspective view showing the principle part of another example of the RFID tag board and the RFID tag.
Figure 4:
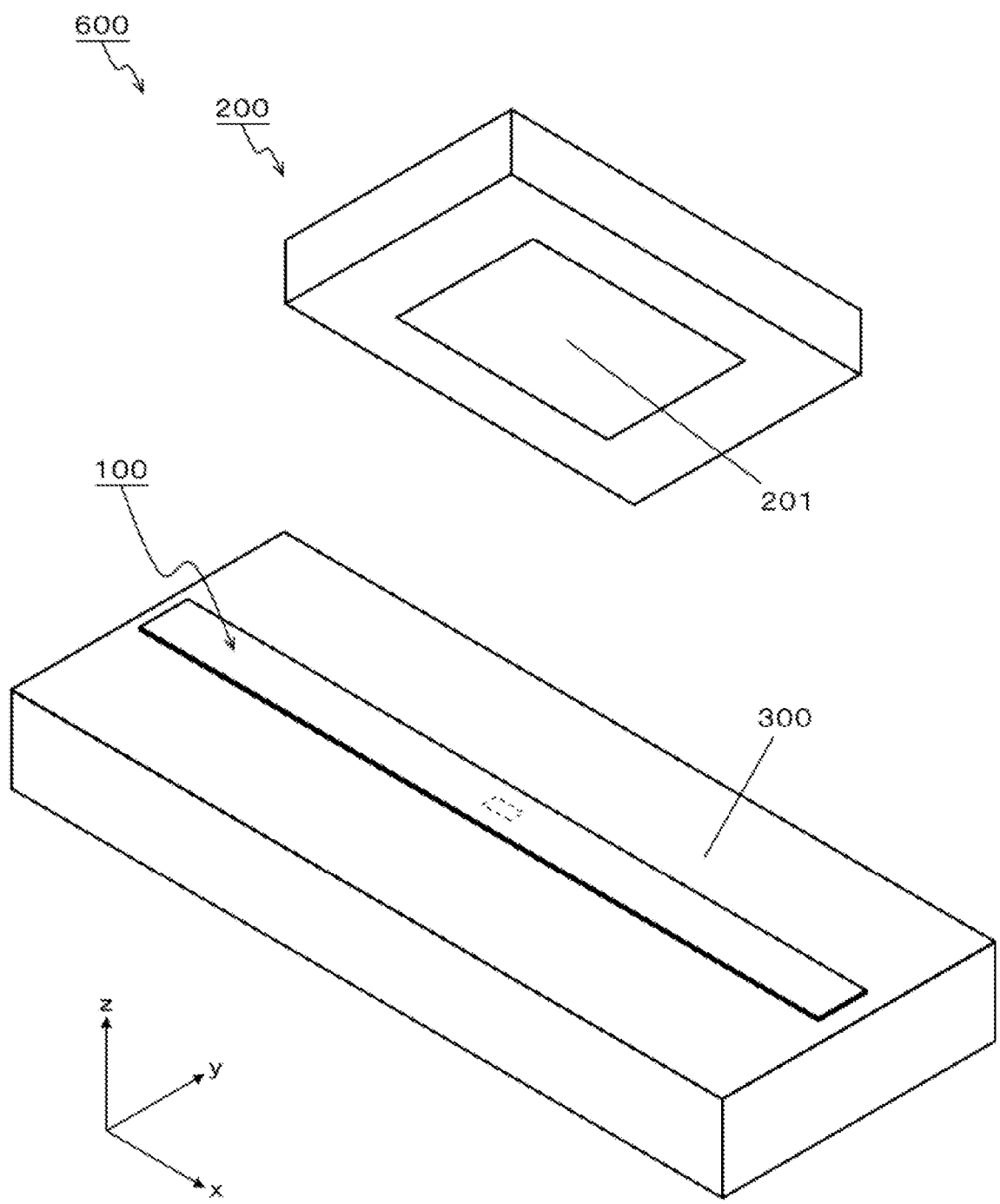
FIG. 4 is a schematic view showing an RFID system.
Figure 5:
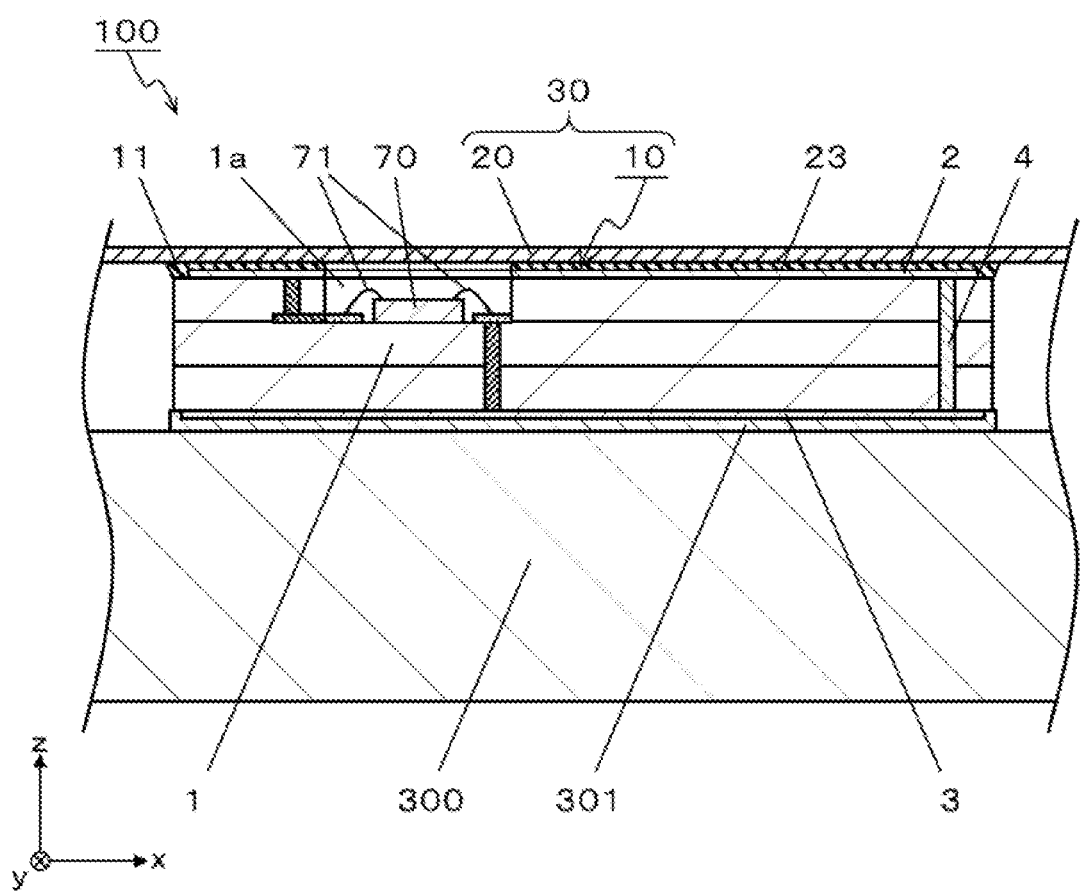
FIG. 5 is a cross-sectional view showing an example of the principle part of the RFID tag shown in FIG. 2.
Figure 6:
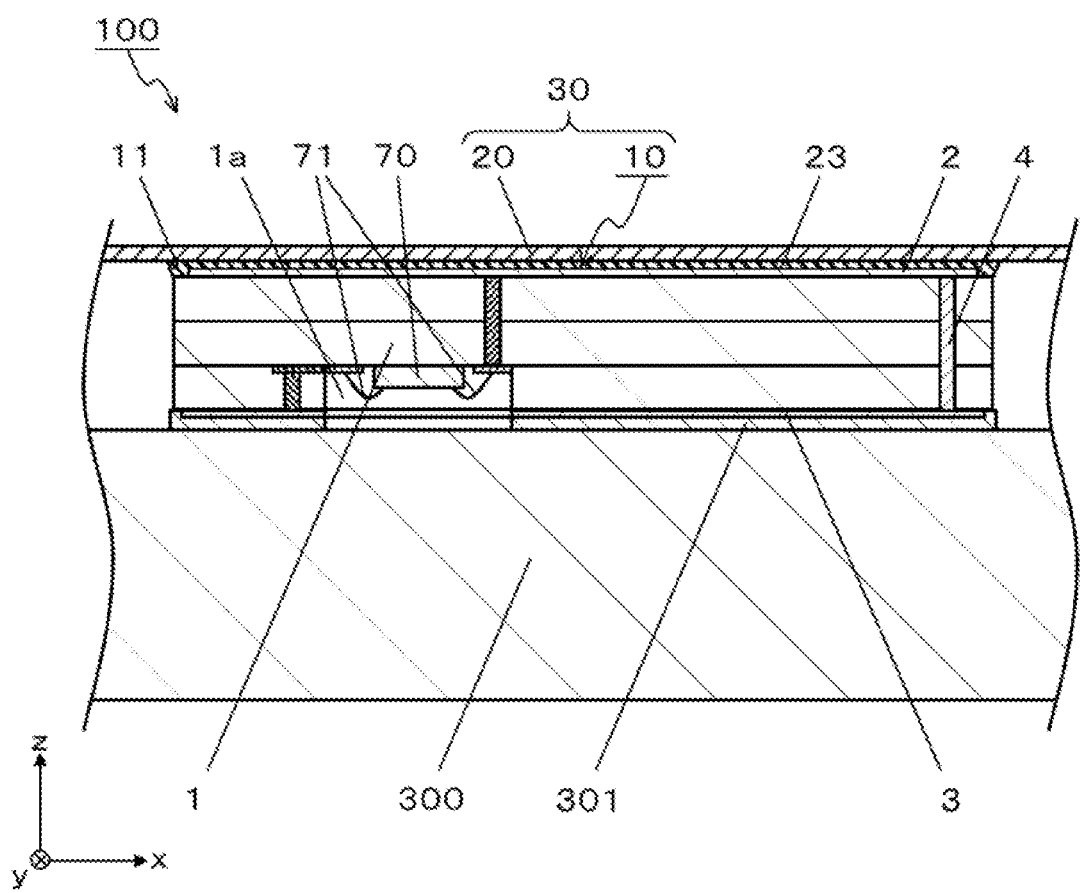
FIG. 6 is a cross-sectional view showing an example of the principle part of the RFID tag shown in FIG. 3.
Figure 7:
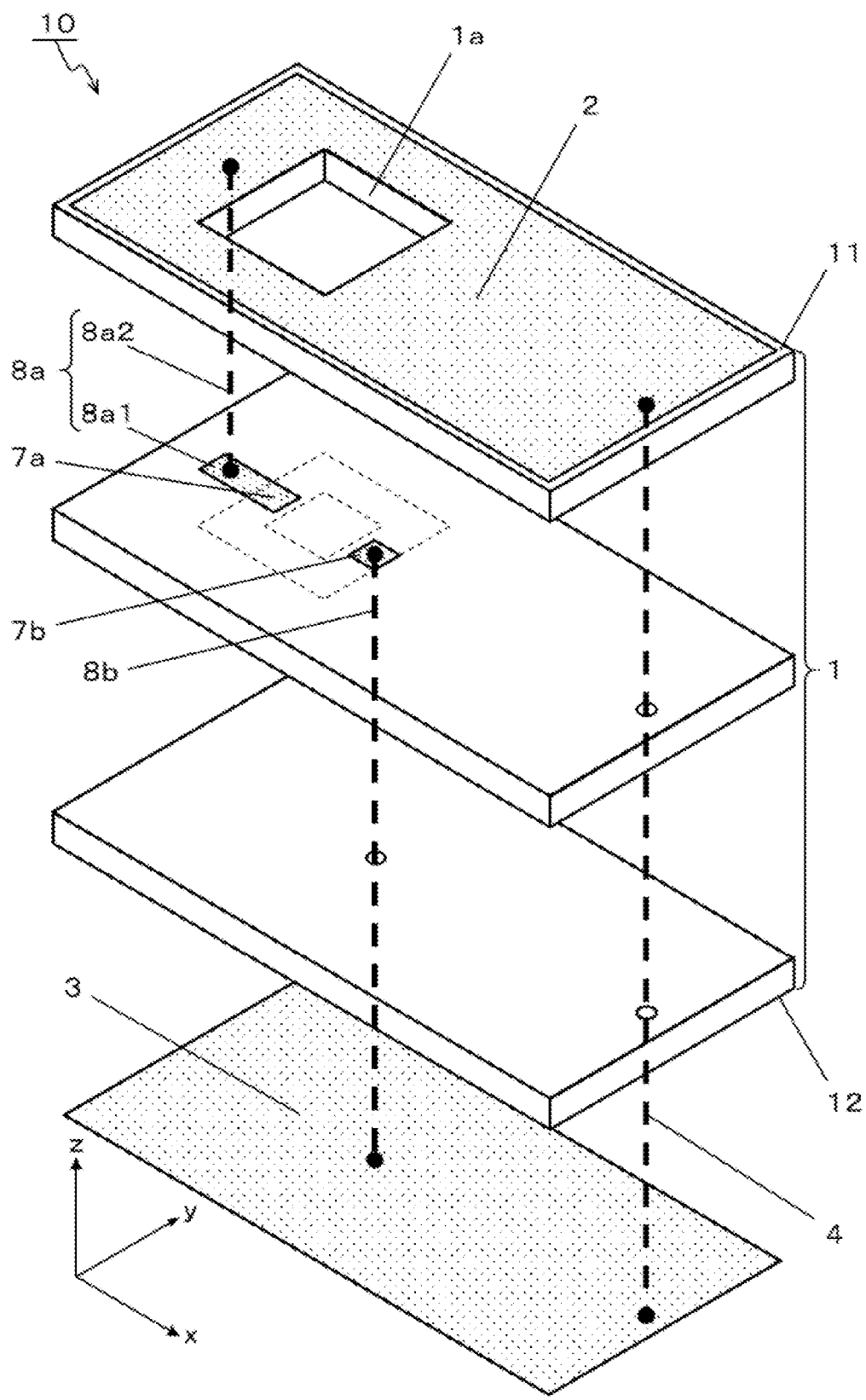
FIG. 7 is an exploded perspective view showing an example of a circuit board of the RFID tag shown in FIG. 5.
Figure 8:
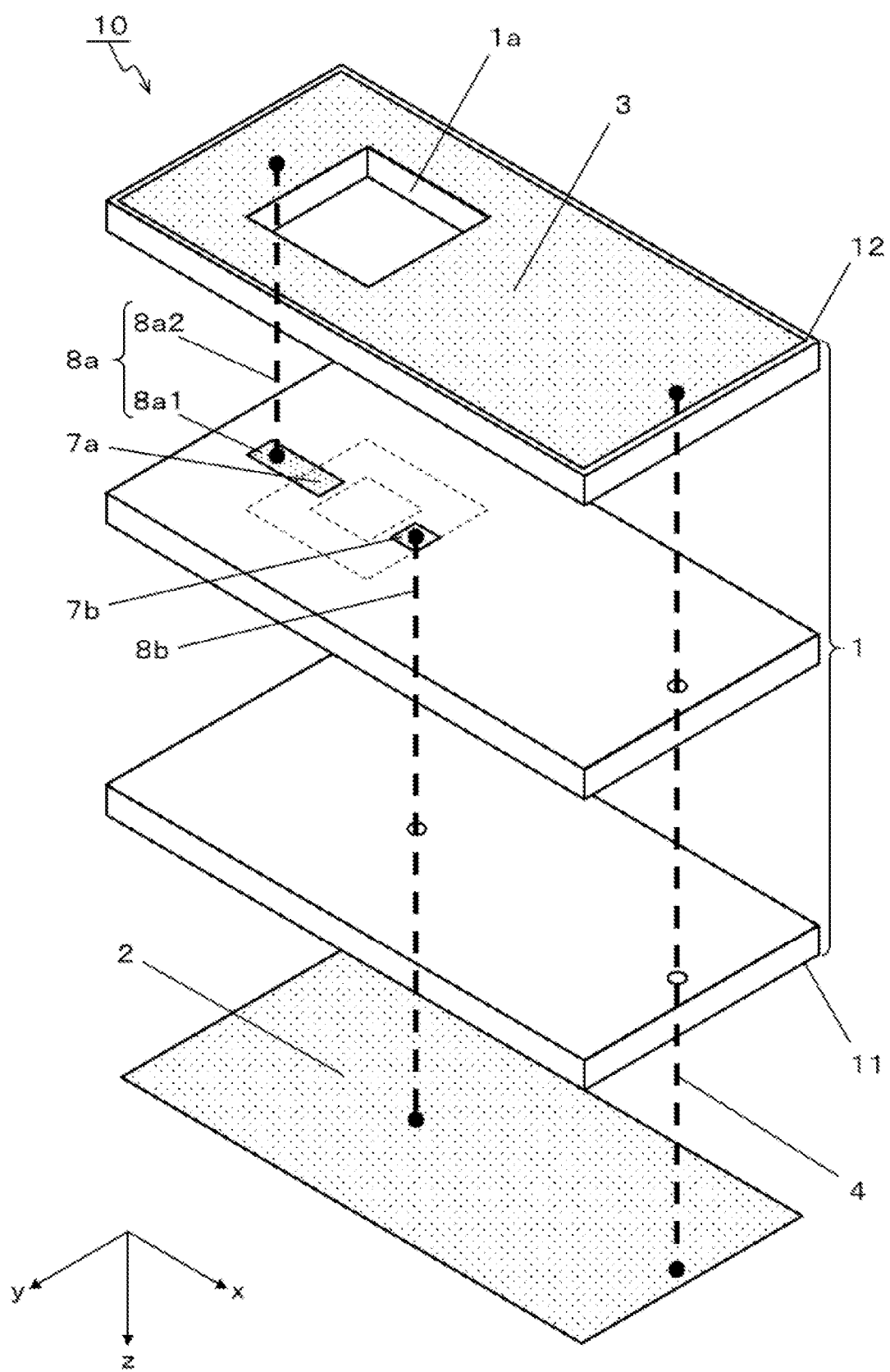
FIG. 8 is an exploded perspective view showing an example of the circuit board of the RFID tag shown in FIG. 6.

FIG. 1 is an exploded perspective view showing an example of the RFID tag board and the RFID tag. FIG. 2 is an exploded perspective view showing the principle part of the example of the RFID tag board and the RFID tag in an enlarged manner. FIG. 3 is an exploded perspective view showing the principle part of another example of the RFID tag board and the RFID tag in an enlarged manner. FIG. 4 is a schematic view showing the RFID system. FIG. 5 is a cross-sectional view showing an example of the principle part of the RFID tag shown in FIG. 2. FIG. 6 is a cross-sectional view showing an example of the principle part of the RFID tag shown in FIG. 3. FIG. 4 to FIG. 6 show the RFID tag mounted on an article. FIG. 7 is an exploded perspective view showing an example of the circuit board of the RFID tag shown in FIG. 5. FIG. 8 is an exploded perspective view showing an example of the circuit board of the RFID tag shown in FIG. 6. In FIG. 7 and FIG. 8, thick broken lines represent through conductors, and black circles represent connection positions.

Articles to (on) which RFID tags are attached (mounted) include conductive articles, such as metallic articles. Conventional RFID tags are poor in communication characteristics, such as communication distance, when they are mounted on metallic articles, and tend to be large in order to improve communication characteristics. For example, the RFID tag disclosed in Patent Literature 1 is not produced by taking any method for mounting it on a metallic article. When this RFID tag is mounted on a metallic article with the radiating plate facing the article, the radiating plate does not function as an antenna, and the communication distance becomes short. Although this problem is solved by mounting the RFID tag on a metallic article with the side opposite to the radiating plate facing the article, in this case, a possibility arises that the semiconductor element may contact the article, thereby impairing connection between the semiconductor element and the circuit board or damaging the semiconductor element, and consequently make transmission and reception of information difficult. Thus, there is a possibility that information communication characteristics and reliability may decrease.

In the RFID tag disclosed in Patent Literature 2, the circuit board is based on a dipole antenna. Hence, the RFID tag is difficult to function as an antenna when it is mounted on a metallic article. This RFID tag is therefore configured by disposing a metallic plate on the side of the circuit board opposite to the auxiliary antenna with a dielectric sheet in between, and consequently is thick and heavy.

An RFID tag board 30 of the present disclosure includes: a circuit board 10 having a recess 1a; and a radiation member 20 fixed to the circuit board 10. An RFID tag 100 includes this RFID tag board 30 and a semiconductor element mounted in the recess 1a of the circuit board 10 of the RFID tag board 30 and connected to a first electrode and a second electrode of the circuit board 10. An RFID system 600 includes this RFID tag 100 having the above configuration and a reader/writer 200 having an antenna 201 that transmits and receives radio waves to and from the RFID tag 100.

The circuit board 10 of the RFID tag board 30 includes a dielectric substrate 1 including: a first surface 11 (upper surface); a second surface 12 (lower surface) that is opposite to the first surface and is a mounting surface to be mounted on an article 300 described later; and the recess 1a. The circuit board 10 further includes: a radiation conductor 2 on the first surface 11 of the dielectric substrate 1; a ground conductor 3 on the second surface 12 of the dielectric substrate 1; and a connection conductor 4 that electrically connects the radiation conductor 2 and the ground conductor 3. In the examples shown in FIG. 5 to FIG. 8, the connection conductor 4 penetrates the dielectric substrate 1 in the thickness direction and is connected to the radiation conductor 2 at only a portion of the peripheral portion of the radiation conductor 2. Because the second surface 12 is the mounting surface to be mounted on the article 300, the RFID tag 100 is mounted on the article 300 with the ground conductor 3 facing the surface of the article 300.

Conductor parts, such as the radiation conductor 2 and the ground conductor 3, are parts that function as an antenna when the circuit board 10 is used for the RFID tag 100. This antenna includes the radiation conductor 2, the ground conductor 3, and the connection conductor 4 that electrically connects these conductors. These constitute an inverted-F antenna as an antenna that transmits and receives radio waves to and from the antenna 201 of the reader/writer 200 described later. The inverted-F antenna is based on a patch antenna and can be directly attached to the metallic article 300. The inverted-F antenna is suitable for the circuit board 10 for the RFID tag 100 because the inverted-F antenna can be smaller than a patch antenna. When this circuit board 10 is used, no member or the like for mounting the RFID tag 100 on the metallic article 300 is needed. Consequently, the RFID tag board 30 and the RFID tag 100 are small.

The radiation conductor 2 is an antenna conductor as described above, and the upper end portion of the connection conductor 4 is connected to an end portion of the radiation conductor 2 that has a rectangular external shape. In the examples shown in FIG. 7 and FIG. 8, the connection conductor 4 is connected to the peripheral portion near a side of the rectangular radiation conductor 2. That is, as described above, the connection conductor 4 is connected to the radiation conductor 2 at only a portion of the peripheral portion of the radiation conductor 2. The lower end portion of the connection conductor 4 is connected to an end portion of the ground conductor 3. In the examples shown in FIG. 7 and FIG. 8, the connection conductor is connected to the peripheral portion near a side of the rectangular ground conductor 3. Because the connection conductor 4 is connected to the radiation conductor 2 not at the center portion of the radiation conductor 2 but at a portion of the peripheral portion of the radiation conductor 2, they constitute the inverted-F antenna together with the ground conductor 3.

The circuit board 10 has the recess 1a for accommodating a semiconductor element 70. The recess 1a is open on the first surface 11 (upper surface) or the second surface 12 (lower surface) that are the main surfaces of the dielectric substrate 1 of the circuit board 10. In the examples shown in FIG. 2, FIG. 5 and FIG. 7, the recess 1a is provided in the first surface 11 of the dielectric substrate 1. In the examples shown in FIG. 3, FIG. 6 and FIG. 8, the recess 1a is provided in the second surface 12 of the dielectric substrate 1. The semiconductor element 70 can be mounted in the circuit board 10 without protruding from the circuit board 10 by being accommodated in the recess 1a. This reduces the possibility that the semiconductor element 70 may contact the article 300 or the like, thereby impairing the connection between the semiconductor element 70 and the circuit board 10 or damaging the semiconductor element 70. Further, because the semiconductor element 70 does not protrude from the circuit board 10, the RFID tag 100 can be thin (small).

When the recess 1a is provided in the lower surface of the circuit board 10 (the second surface 12 of the dielectric substrate 1), the lower surface (the second surface 12) being the mounting surface to be mounted on the article 300, the ground conductor 3 on the second surface 12 is shaped to have an opening at a position corresponding to the recess 1a. The RFID tag 100 is mounted on the article 300 such that the recess 1a is covered with the surface of the article 300. That is, the RFID tag 100 is used with the lower surface brought into contact with the surface of the metallic article 300, or as in the example shown in FIG. 6, with the lower surface bonded thereto with a bonding material 301. Distance between the radiation conductor 2 and a conductor having ground potential and facing the radiation conductor 2 (the ground conductor 3 or the surface of the article 300) differs between the portion where the recess 1a is present and the portion where the recess 1a is not present. Because at the portion where the recess 1a is present, the ground conductor 3 is not present on the lower surface of the dielectric substrate 1, the conductor having the ground potential is the surface of the article 300, and therefore the distance between the radiation conductor 2 and the conductor having the ground potential is long. This distance may vary due to variation in the thickness of the bonding material 301. The variation in the distance between the radiation conductor 2 and the conductor having the ground potential may cause a shift in the resonance frequency of the RFID tag 100.

As in the examples shown in FIG. 2, FIG. 5 and FIG. 7, when the recess 1a is provided in the first surface 11 of the dielectric substrate 1, the shift in the resonance frequency can be reduced efficiently. The RFID tag board 30 having this configuration has the recess 1a in the upper surface. Hence, when the RFID tag board 30 is mounted on the article 300 as the RFID tag 100, the conductor having the ground potential and facing the radiation conductor 2 is the ground conductor 3. The distance between the radiation conductor 2 and the ground conductor 3 does not vary due to the variation in the thickness of the bonding material 301. As described above, because the shift in the resonance frequency is due to the variation in the distance between the radiation conductor 2 and the conductor having the ground potential, reduction of the variation in the distance can suppress the shift in the resonance frequency. The RFID tag board 30 having this configuration makes it easy to produce the RFID tag 100 that can suppress the shift in the resonance frequency.

As in the examples shown in FIG. 3, FIG. 6 and FIG. 8, when the recess 1a is provided in the second surface 12 of the dielectric substrate 1, a conductive lid 73 that closes the opening of the recess 1a may be provided as in an example shown in FIG. 17 described later. By the conductive lid 73 being electrically connected to the ground conductor 3, the ground conductor 3 having the opening closed by the conductive lid 73 becomes the same as the ground conductor 3 having no opening. Hence, the shift in the resonance frequency described above can be suppressed.

The circuit board 10 has a first electrode 7a and a second electrode 7b in the recess 1a. In the example shown in each figure, the first electrode 7a and the second electrode 7b are disposed on the bottom surface of the recess 1a. In the present disclosure, the first electrode 7a is an electrode far from the connection conductor 4, and the second electrode 7b is an electrode near the connection conductor 4. The first electrode 7a is electrically connected to the radiation conductor 2 or the ground conductor 3 by a first connection conductor 8a. The second electrode 7b is electrically connected to the radiation conductor 2 or the ground conductor 3 by a second connection conductor 8b. The first electrode 7a and the second electrode 7b are wiring conductors that are electrically connected to the semiconductor element 70 accommodated in the recess 1a. The first electrode 7a, the second electrode 7b and the semiconductor element 70 constitute a power supply unit in the RFID tag 100.

In the example shown in FIG. 7, the first connection conductor 8a is constituted by: a conductor layer 8a1 between dielectric layers of the dielectric substrate 1; and a through conductor 8a2 extending from the conductor layer 8a1 to the radiation conductor 2 on the first surface 11 of the dielectric substrate 1, penetrating a dielectric layer. The conductor layer of the first connection conductor 8a is integrated with the first electrode 7a, and can be regarded as a portion obtained by extending the first electrode 7a from the recess 1a into the dielectric substrate 1. The second connection conductor 8b is constituted by only a through conductor extending from the second electrode 7b to the ground conductor 3 on the second surface 12 of the dielectric substrate 1, penetrating dielectric layers.

In the example shown in FIG. 8, the first connection conductor 8a is constituted by: a conductor layer 8a1 between dielectric layers of the dielectric substrate 1; and a through conductor 8a2 extending from the conductor layer 8a1 to the ground conductor 3 on the second surface 12 of the dielectric substrate 1, penetrating a dielectric layer. The conductor layer 8a1 of the first connection conductor 8a is integrated with the first electrode 7a, and can be regarded as a portion obtained by extending the first electrode 7a from the recess 1a into the dielectric substrate 1. The second connection conductor 8b is constituted by only a through conductor extending from the second electrode 7b to the radiation conductor 2 on the first surface 11 of the dielectric substrate 1, penetrating dielectric layers.

The radiation member 20 is fixed to the upper side of the first surface 11 of the circuit board 10. As described above, the RFID tag 100 is mounted on the article 300 with the ground conductor 3 on the second surface 12 facing the surface of the article 300. Hence, between the radiation member 20 and the article 300, the circuit board 10 equipped with the semiconductor element 70 is located. Because the RFID tag 100 has this configuration, an electric field can be radiated between the radiation member 20 and the metallic article 300, and a patch antenna is formed by the radiation member 20 and the circuit board 10. As described above, the circuit board 10 alone functions as the inverted-F antenna, but connecting the radiation member 20 to the radiation conductor 2 forms an antenna more excellent in communication characteristics; to be more specific, an antenna having a longer communication distance. That is, the radiation member 20 can be regarded as a booster antenna. Although the RFID tag 100 constituted by only the circuit board 10 and the radiation member 20 is thin, the RFID tag 100 can communicate with the article 300, on which the RFID tag 100 is mounted, even when the article 300 is conductive, for example, made of metal.

The radiation member 20 includes a conductive antenna conductor 21 that is larger than (the radiation conductor 2 of) the circuit board 10. The length of the antenna conductor 21 of the radiation member 20 can be a half-wave length of the frequency of radio waves that the RFID tag 100 transmits and receives. For example, when the frequency of radio waves that the RFID tag 100 transmits and receives is 920 MHz, the length of the antenna conductor 21 can be about 163 mm, which is the half-wave length.

The radiation member 20 is fixed to the circuit board 10 such that the antenna conductor 21 of the radiation member 20 faces the radiation conductor 2 on the first surface 11 of the circuit board 10. The radiation member 20 may be fixed to the circuit board 10 such that the antenna conductor 21 is electrically connected to the radiation conductor 2, or such that the antenna conductor 21 and the radiation conductor 2 are in the no-conduction state. The radiation member 20 can be fixed to the circuit board 10, for example, with an adhesive 23 made of resin. The adhesive 23 made of resin is usually insulating. When (the antenna conductor 21 of) the radiation member 20 and the radiation conductor 2 are not directly electrically connected (short-circuited), (the antenna conductor 21 of) the radiation member 20 and the radiation conductor 2 are mainly coupled by an electric field (electromagnetic field coupling). Hence, positional accuracy of the small radiation conductor 2 of the circuit board 10 and the radiation member 20 is not severe as compared with the case of direct connection. In the case of direct connection, when cracks or the like are generated in a connecting material, such as solder, the electrical connection is cut off, whereas in the case of electromagnetic field coupling, even when cracks are generated in a bonding material, the coupling is not cut off. Hence, the RFID tag board 30 and the RFID tag 100 in which the radiation member 20 is fixed to the circuit board 10 with an adhesive have high connection reliability between the antenna including the radiation conductor 2 and the radiation member 20, and also are easy to produce at low cost.

Radio waves (electric field) radiated from the circuit board 10 tend to be radiated more from the end portion(s) of the radiation conductor 2 and the ground conductor 3 in the circuit board 10 opposite to the end portion (s) thereof where the connection conductor 4 is connected, to the outside of the circuit board 10. Radio waves are mainly radiated from between the radiation conductor 2 and the ground conductor 3 at the end portion where the connection conductor 4 is not connected. The direction in which radio waves (electric field) are radiated more strongly is the −x direction of the orthogonal coordinate system in the examples shown in FIG. 5 to FIG. 8 and FIG. 14 to FIG. 28. As described above, the antenna conductor 21 and the antenna of the circuit board 10 are coupled by an electric field (electromagnetic field coupling) by the radiation member 20 being fixed to the circuit board 10. In order to enhance this coupling, the radiation member 20 may be fixed to the circuit board 10 such that the length direction of the antenna conductor 21 of the radiation member 20 is along the direction in which the radiation conductor 2 (and the ground conductor 3) extends from the position where the connection conductor 4 is connected. This is shown, for example, in the examples shown in FIG. 1 to FIG. 3, FIG. 5, FIG. 6, FIG. 9 to FIG. 17, FIG. 28 and FIG. 29. The direction in which the radiation conductor 2 extends may be referred to as the direction from the position on the radiation conductor 2 where the connection conductor 4 is connected toward the center portion of the radiation conductor 2, or the direction along a side(s) of the rectangular radiation conductor 2 orthogonal to the side of the radiation conductor 2 near which the connection conductor 4 is connected. When this direction of the circuit board 10 is a first direction of the circuit board 10, the radiation member 20 may be fixed to the circuit board 10 such that the length direction of the antenna conductor 21 of the radiation member 20 is along the first direction of the circuit board 10. When the direction in which radio waves (electric field) from the circuit board 10 are radiated strongly coincides with the length direction of the antenna conductor 21, the coupling between the antenna of the circuit board 10 and the antenna conductor 21 of the radiation member 20 further increases, so that the antenna gain of the RFID tag 100 further increases. In the case where the antenna conductor 21 has a meander shape as in the example shown in FIG. 10, or in the case where the antenna conductor 21 has a coil shape as in the example shown in FIG. 11, namely in the case(s) where the antenna conductor 21 is bent, the length direction is the length direction of the antenna conductor 21 as a whole. The length direction of the antenna conductor 21 as a whole is the x direction of the orthogonal coordinate system shown in the drawings, as with the case where the antenna conductor 21 is straight as in the example shown in FIG. 9. This "the length direction of the antenna conductor 21 is along the first direction of the circuit board 10" is not limited to the case where these two directions completely coincide and are parallel, but includes the case where these two directions form an angle of 15° or smaller. When the angle formed by these two directions is large, the end portion of the radiation conductor 2 opposite to the end portion thereof where the connection conductor 4 is connected overlaps the antenna conductor 21.

Thus, the RFID tag board 30 of the present disclosure has the recess 1a that is capable of accommodating the semiconductor element 70, and includes the circuit board 10 and the radiation member 20 that are excellent in communication characteristics even when the RFID tag board 30 is mounted on the metallic article 300. Hence, the RFID tag board 30 makes it easy to produce the RFID tag 100 that is small and excellent in communication characteristics, and has high information communication reliability.

Figure 9:
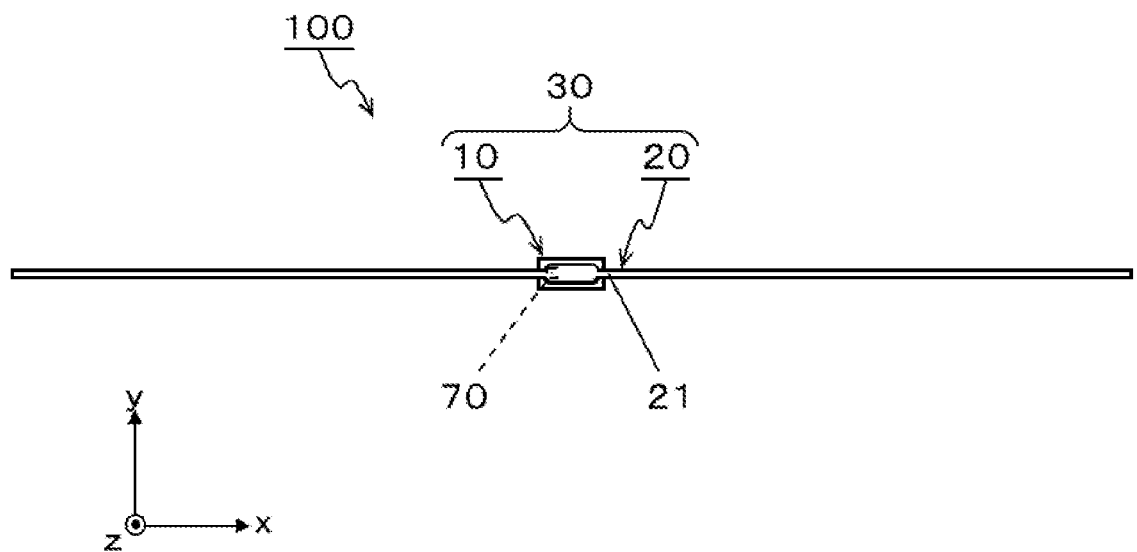
FIG. 9 is a plan view showing another example of the RFID tag board and the RFID tag.
Figure 10:
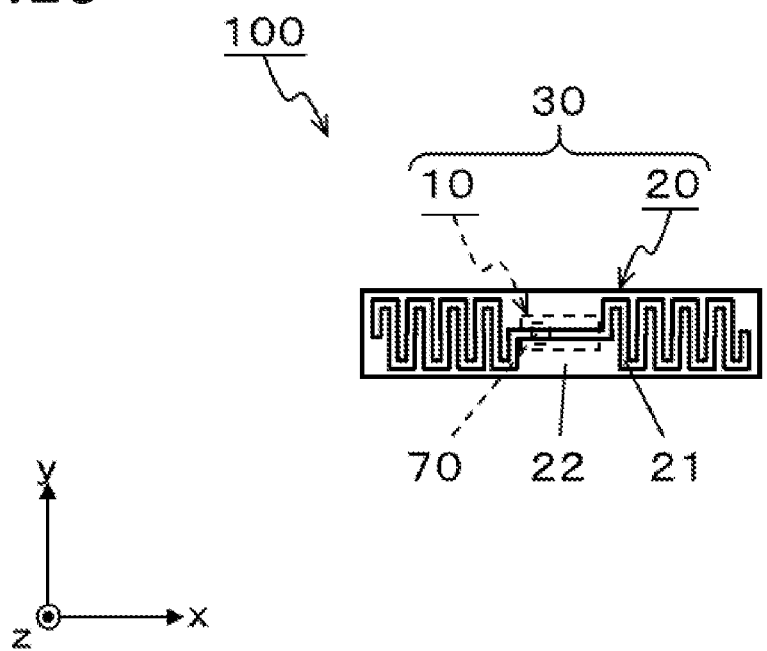
FIG. 10 is a plan view showing another example of the RFID tag board and the RFID tag.
Figure 11:
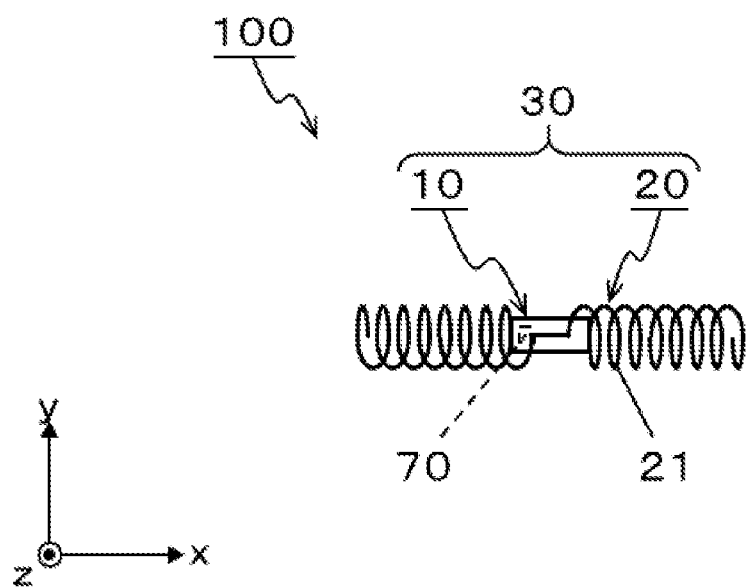
FIG. 11 is a plan view showing another example of the RFID tag board and the RFID tag.

FIG. 9 to FIG. 11 are plan views showing other examples of the RFID tag board and the RFID tag.

In the example shown in FIG. 9, the radiation member 20 is constituted by only the antenna conductor 21. The antenna conductor 21 has a narrow width and a long and narrow shape as compared with the radiation member 20 in the example shown in FIG. 1 or the like, and only a connection portion that connects with the circuit board 10 is wide. This makes the RFID tag board 30 and the RFID tag 100 small and light, and also increases connection reliability between the circuit board 10 and the radiation member 20. Although the connection portion of the antenna conductor 21 is wide, it is narrower than the circuit board 10. When the width of the connection portion of the antenna conductor 21 is narrower than that of the circuit board 10, the electric field radiated from the circuit board 10 can go around to the upper surface of the antenna conductor 21, namely to the surface of the antenna conductor 21 opposite to the circuit board 10. Hence, the coupling between the circuit board 10 and the antenna conductor 21 further increases, so that the antenna gain of the RFID tag 100 further increases.

In the example shown in FIG. 10, the antenna conductor 21 of the radiation member 20 has a meander shape of being bent repeatedly. Hence, even when the electrical length of the meandering antenna conductor 21 is the same as that of the straight antenna conductor 21 in the example shown in FIG. 9, the length of the meandering antenna conductor 21 as a whole is shorter. This can make the RFID tag board 30 and the RFID tag 100 small, and increase the degree of freedom in the attaching position on the article 300, the size of the article 300, and so forth. Further, because the length of portions of the antenna conductor 21 protruding from the circuit board 10 is short, the possibility can be reduced that the antenna conductor 21 may be bent by its own weight and contact the metallic article 300, so that the radiation member 20 may not function as a booster antenna.

In the example shown in FIG. 11, the antenna conductor 21 of the radiation member 20 has a wire shape and a coil shape. Hence, even when the electrical length of the coiled antenna conductor 21 is the same as that of the straight antenna conductor 21 in the example shown in FIG. 9, the length of the coiled antenna conductor 21 as a whole is shorter. This can make the RFID tag board 30 and the RFID tag 100 small, and increase the degree of freedom in the attaching position on the article 300, the size of the article 300, and so forth.

As in the example shown in FIG. 10, the radiation member 20 may include the antenna conductor 21 and an insulating member 22. The insulating member 22 increases rigidity of the radiation member 20, and accordingly reduces the possibility that the radiation member 20 may, for example, sag by its own weight, vibration or the like and contact the metallic article 300. When the insulating member 22 is disposed on the circuit board 10 side, even if the radiation member 20 sags by its own weight or the like and contacts the metallic article 300, the antenna conductor 21 is prevented from contacting the metallic article 300 and being short-circuited. Hence, the radiation member 20 functions as a booster antenna. Further, when the antenna conductor 21 is made of metal that is prone to corroding, such as copper, the antenna conductor 21 is protected by the insulating member 22 covering the surface of the antenna conductor 21. For example, the antenna conductor 21 on a thin plate may be sandwiched between insulating members 22. The same applies to the case where the antenna conductor 21 is straight, as in the example shown in FIG. 9. Further, when the antenna conductor 21 has a wire shape as in the example shown in FIG. 11, the antenna conductor 21 may be covered with the insulating member 22.

Figure 12:
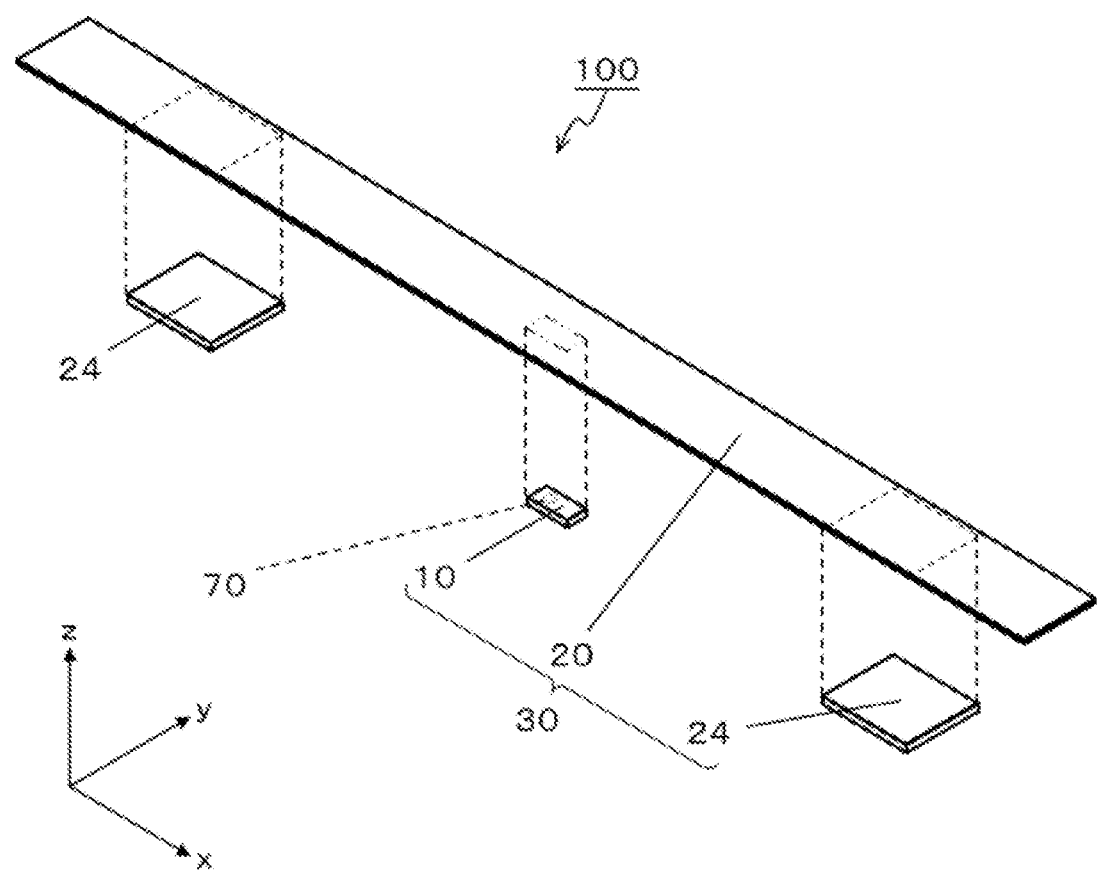
FIG. 12 is an exploded perspective view showing another example of the RFID tag board and the RFID tag.
Figure 13:
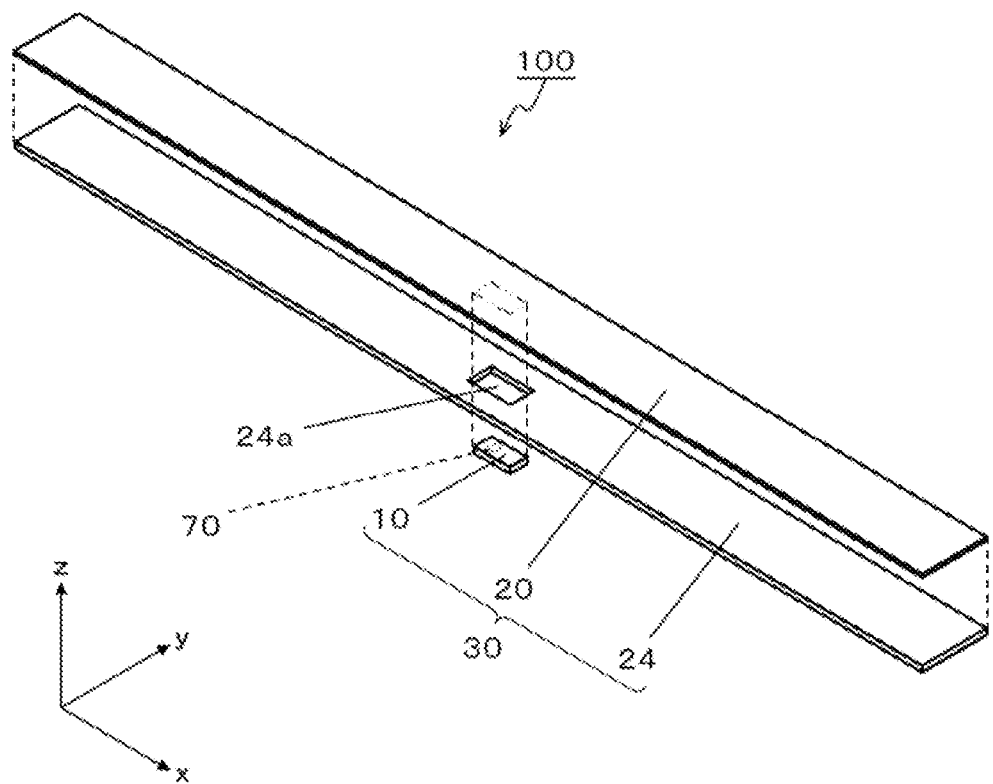
FIG. 13 is an exploded perspective view showing another example of the RFID tag board and the RFID tag.
Figure 14:
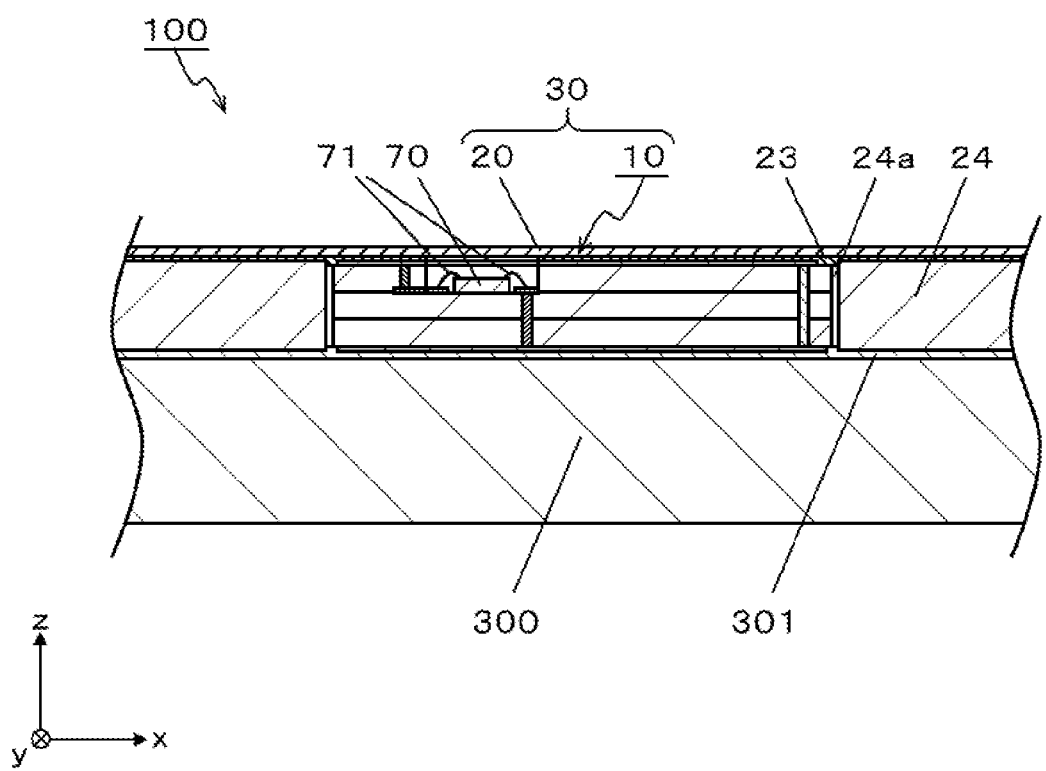
FIG. 14 is a cross-sectional view showing an example of the principle part of the RFID tag shown in FIG. 13.
Figure 15:
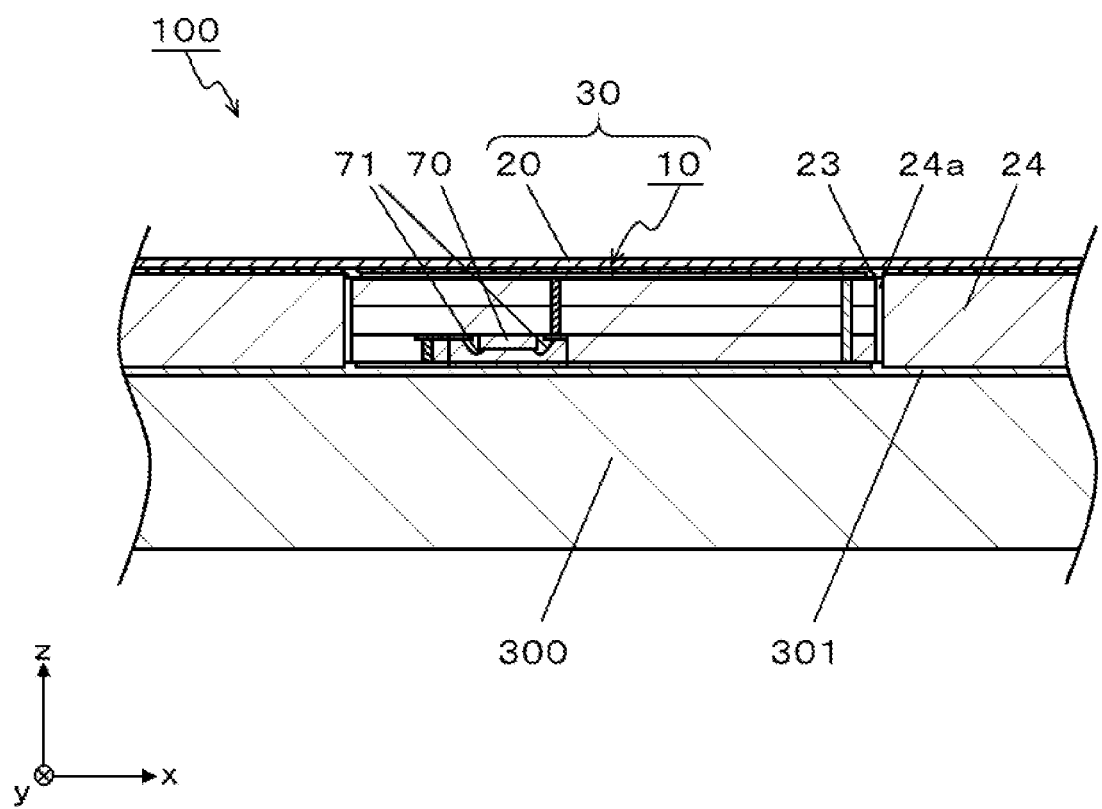
FIG. 15 is a cross-sectional view showing another example of the principle part of the RFID tag shown in FIG. 13.

FIG. 12 and FIG. 13 are exploded perspective views showing other examples of the RFID tag board and the RFID tag. FIG. 14 and FIG. 15 are cross-sectional views showing examples of the principle part of the RFID tag shown in FIG. 13. FIG. 14 and FIG. 15 show the RFID tag mounted on the article. FIG. 14 shows the case where the recess 1a is provided in the first surface 11 of the circuit board 10, and FIG. 15 shows the case where the recess 1a is provided in the second surface 12 of the circuit board 10.

As in the examples shown in FIG. 12 and FIG. 13, the RFID tag board 30 and the RFID tag 100 may further include a spacer(s) 24 disposed on the sides of the circuit board 10 and bonded to the portions of the radiation member 20 protruding from the circuit board 10 in plan view. This configuration can prevent the antenna conductor 21 of the radiation member 20 from contacting the article 300 even when the radiation member 20 does not have the above insulating member 22. Further, regardless of presence or absence of the insulating member 22, fixing the spacer(s) 24 to the article 300 together with the circuit board 10 prevents the radiation member 20 from repeatedly sagging due to vibration of the article 300 or the like, for example. This reduces the possibility that stress may be applied to and damage the adhesive 23 between the circuit board 10 and the radiation member 20, thereby impairing the connection between the circuit board 10 and the radiation member 20. Hence, the RFID tag 100 has high connection reliability between the circuit board 10 and the radiation member 20, and maintains communication characteristics of the radiation member 20 and accordingly has high reliability about communication characteristics too.

In the example shown in FIG. 12, the radiation member 20 protrudes from both ends in the longer direction of the circuit board 10 outward (to the + side and the − side of the x direction of the orthogonal coordinate system), and the spacer 24 is disposed under each of the two protruding portions, namely two spacers 24 are disposed in total. The spacers 24 are each a cuboid (quadrilateral plate) having a width equal to that of the radiation member 20 and a length shorter than that of the protruding portion. The size and shape of the spacers 24 are not limited thereto, and has no limitations as long as the abovementioned effect(s) can be obtained.

In contrast, in the example shown in FIG. 13, the spacer 24 is plate-like and has a through hole 24a. Hence, the RFID tag board 30 and the RFID tag 100 can have the circuit board 10 disposed in the through hole 24a. The spacer 24 surrounds the circuit board 10, and in this case too, is disposed on the sides of the circuit board 10. When the spacer 24 has this configuration, the circuit board 10 equipped with the semiconductor element 70 is surrounded by the radiation member 20 and the spacer 24, thereby not being exposed. This improves protectiveness for the semiconductor element 70 and the circuit board 10 in handling of the RFID tag 100. Further, when the RFID tag 100 is mounted on the article 300, as in the examples shown in FIG. 14 and FIG. 15, the circuit board 10 equipped with the semiconductor element 70 is disposed in the space surrounded by the radiation member 20, the spacer 24 and the article 300. This improves protectiveness for the RFID tag 100 against its usage environment. The above radiation member 20 is relatively soft and easy to deform. Integration of the spacer 24 and the radiation member 20 having the same or similar size as in the example shown in FIG. 13 improves rigidity of the RFID tag board 30 and the RFID tag 100, and hence improves handleability thereof and easiness thereof to mount on the article 300.

The spacer(s) 24 may be bonded to the lower surface of the radiation member 20 (the surface on the circuit board 10 side) with the adhesive 23 for connecting the radiation member 20 and the circuit board 10. As in the example shown in FIG. 13, when the number of spacers 24 is one, and the spacer 24 and the circuit board 10 are near one another, time and effort to dispose the adhesive 23 are reduced.

Figure 16:
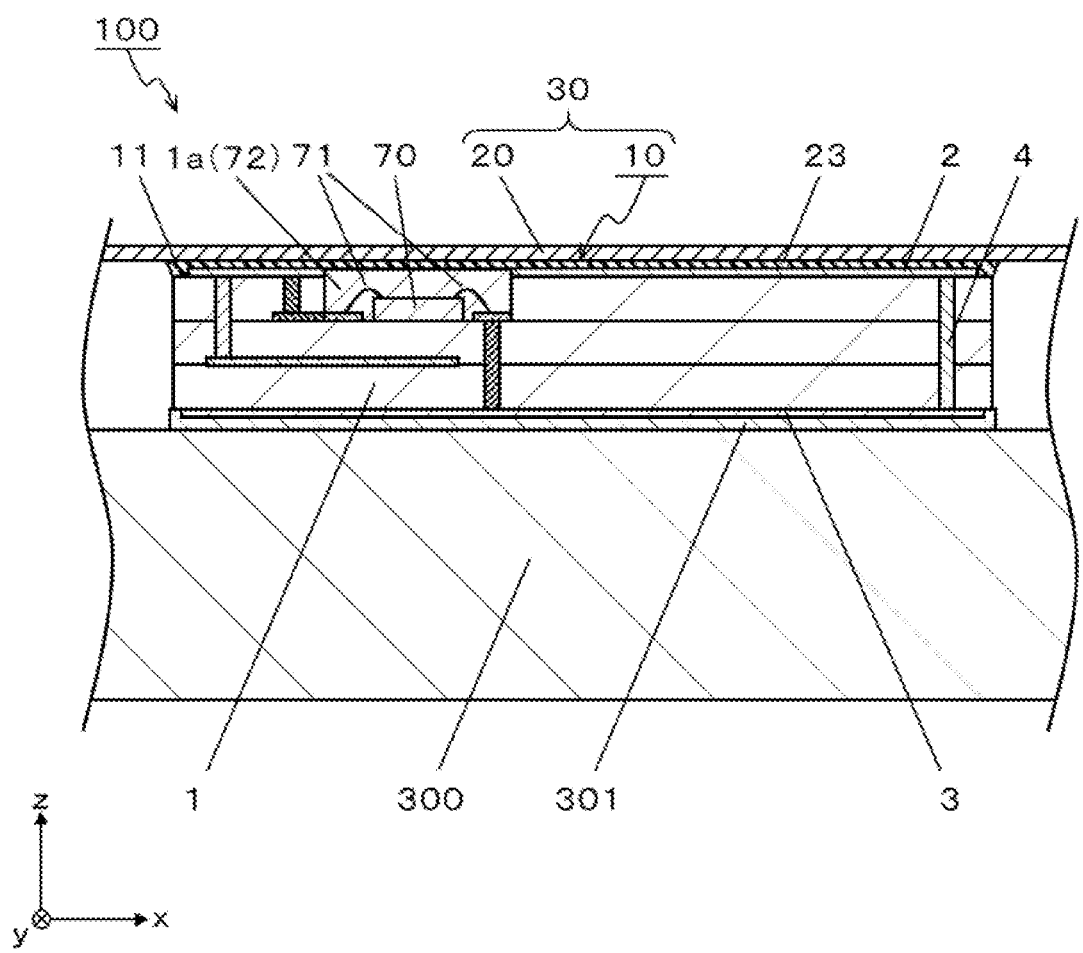
FIG. 16 is a cross-sectional view showing another example of the principle part of the RFID tag shown in FIG. 2.
Figure 18:
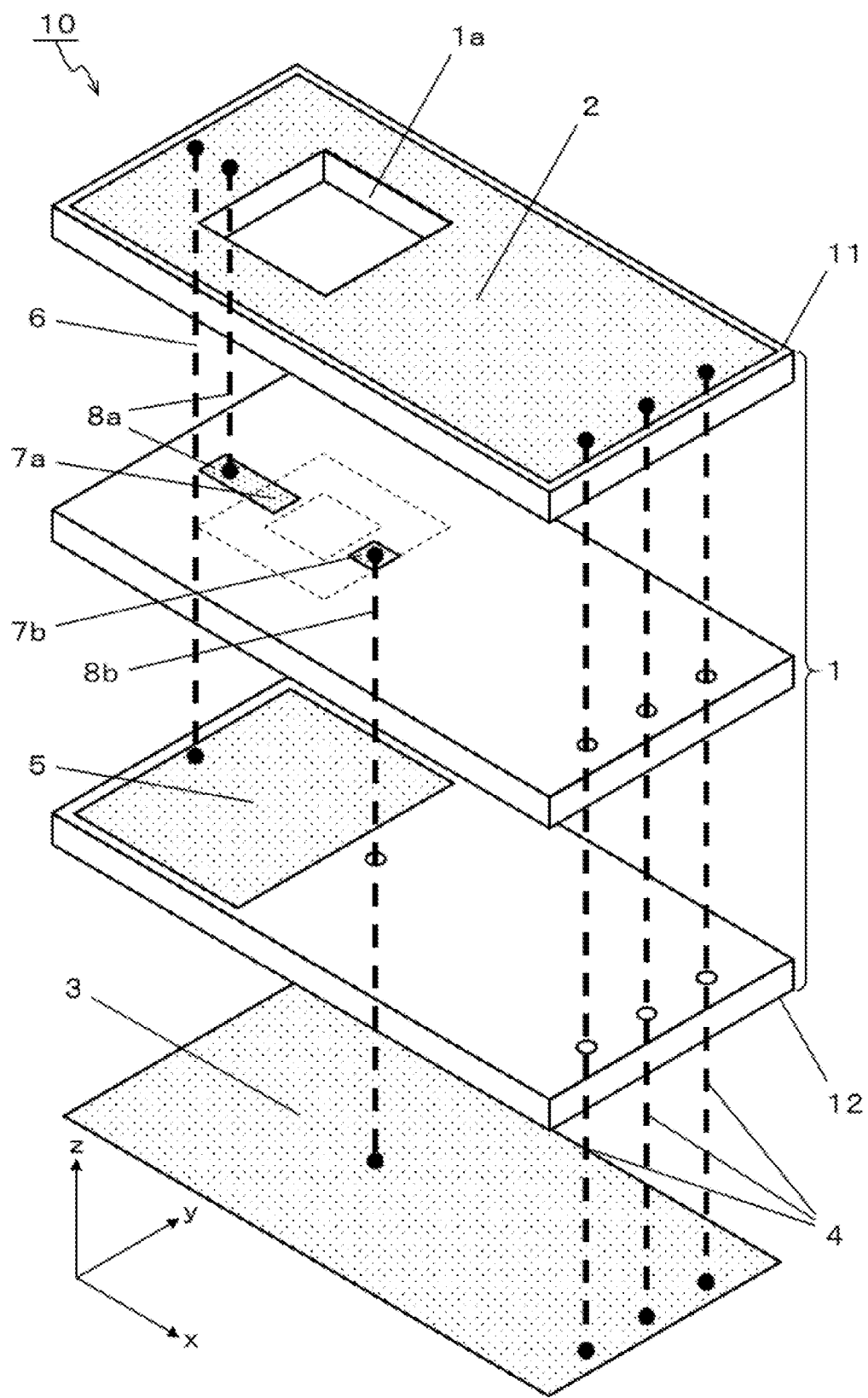
FIG. 18 is an exploded perspective view showing an example of the circuit board of the RFID tag shown in FIG. 16.
Figure 19:
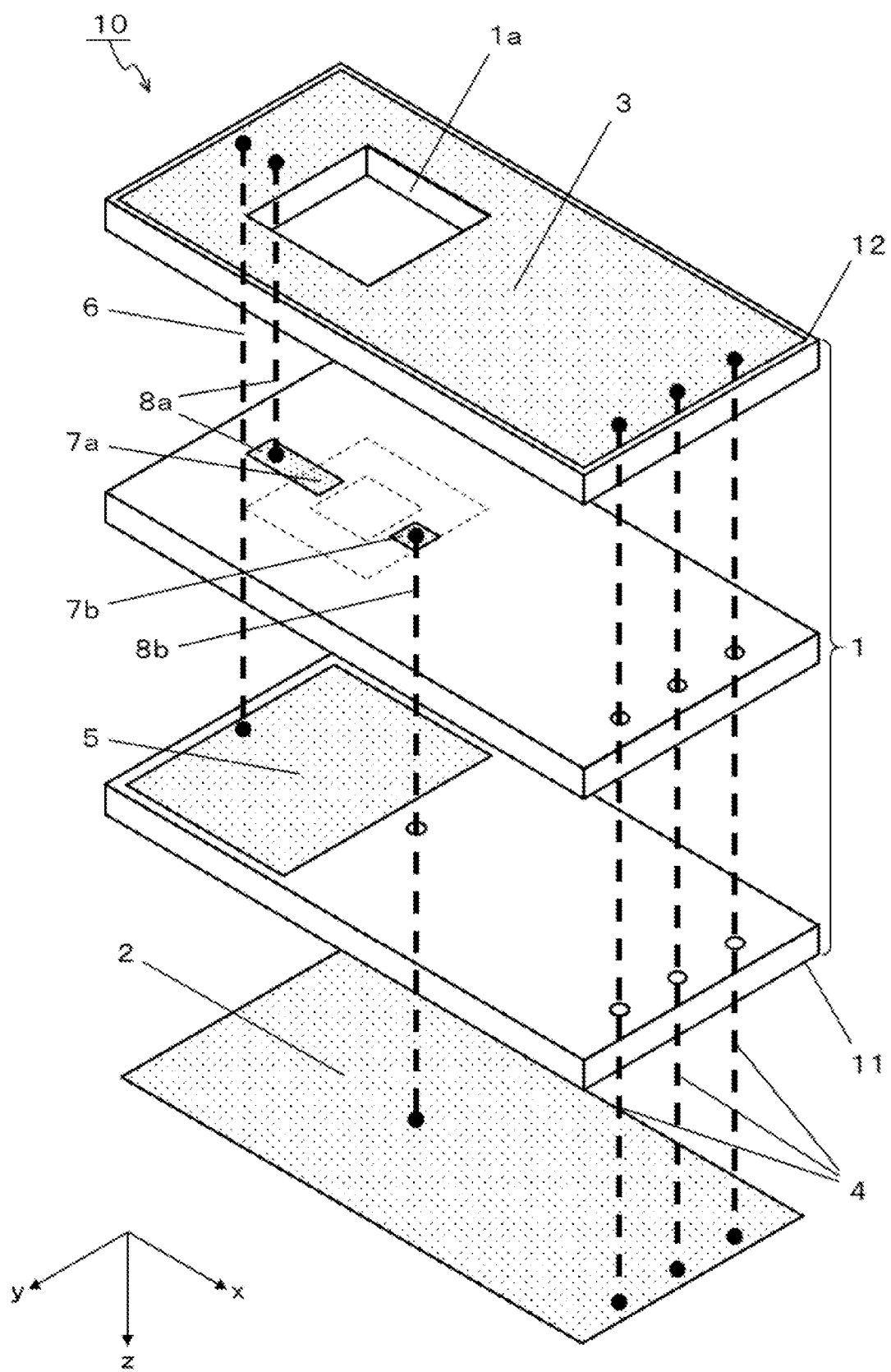
FIG. 19 is an exploded perspective view showing an example of the circuit board of the RFID tag shown in FIG. 17.

FIG. 16 is a cross-sectional view showing another example of the principle part of the RFID tag shown in FIG. 2. FIG. 17 is a cross-sectional view showing another example of the principle part of the RFID tag shown in FIG. 3. FIG. 16 and FIG. 17 show the RFID tag mounted on the article 300. FIG. 18 is an exploded perspective view showing an example of the circuit board of the RFID tag shown in FIG. 16. FIG. 19 is an exploded perspective view showing an example of the circuit board of the RFID tag shown in FIG. 17.

As in the examples shown in FIG. 16 to FIG. 19, the circuit board 10 of the RFID tag board 30 may further include a capacitance conductor 5 and a capacitance part connection conductor 6. The capacitance conductor 5 faces a portion of the ground conductor 3 or the radiation conductor 2 in the dielectric substrate 1. The capacitance part connection conductor 6 electrically connects the capacitance conductor 5 and the radiation conductor 2 or the capacitance conductor 5 and the ground conductor 3.

In the examples shown in FIG. 16 and FIG. 18, the capacitance conductor 5 faces the ground conductor 3 with a portion of the dielectric substrate 1 in between, and is electrically connected to the radiation conductor 2 through the capacitance part connection conductor 6. In the examples shown in FIG. 17 and FIG. 19, the capacitance conductor 5 faces the radiation conductor 2 with a portion of the dielectric substrate 1 in between, and is electrically connected to the ground conductor 3 through the capacitance part connection conductor 6. The capacitance conductor 5 has a function of giving a predetermined capacitance to the antenna conductor. The capacitance conductor 5 extends toward the center portion from the end portion opposite to the end portion of the radiation conductor 2 or the ground conductor 3 where the connection conductor 4 is connected. The capacitance conductor 5 is electrically connected to the radiation conductor 2 or the ground conductor 3 by the capacitance part connection conductor 6 at the end portion opposite to the end portion where the connection conductor 4 is connected. In the examples shown in FIG. 16 and FIG. 18, the capacitance conductor 5 is electrically connected to the radiation conductor 2, whereas in the examples shown in FIG. 17 and FIG. 19, the capacitance conductor 5 is electrically connected to the ground conductor 3.

When this capacitance conductor 5 is disposed, the capacitance component between the radiation conductor 2 and the ground conductor 3 is large. This can make the radiation conductor 2 and the ground conductor 3 small, and make the inverted-F antenna smaller. That is, the circuit board 10 can be effective in size reduction of the RFID tag 100. Further, because the capacitance conductor 5 faces the ground conductor 3 or the radiation conductor 2 having no opening due to the recess 1a, the degree of freedom in arrangement of the capacitance conductor 5 in the dielectric substrate 1 is high, and the capacitance conductor 5 can be larger. Thus, it is possible to make the capacitance formed between the capacitance conductor 5 and the ground conductor 3 or the radiation conductor 2 larger and make the circuit board 10 smaller.

Figure 20:
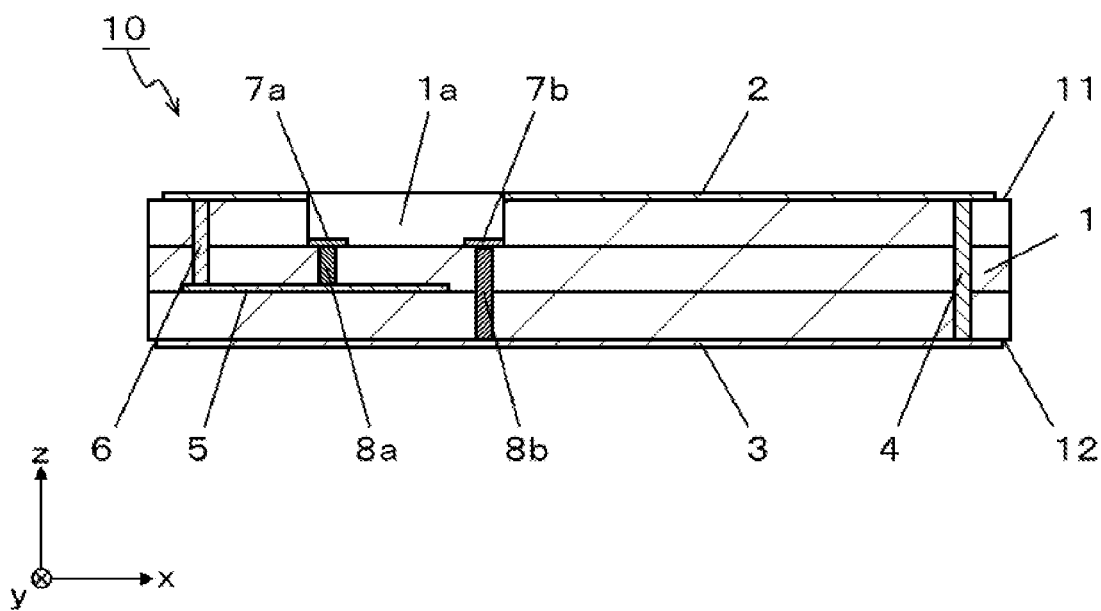
FIG. 20 is a cross-sectional view showing another example of the circuit board of the RFID tag shown in FIG. 2.
Figure 21:
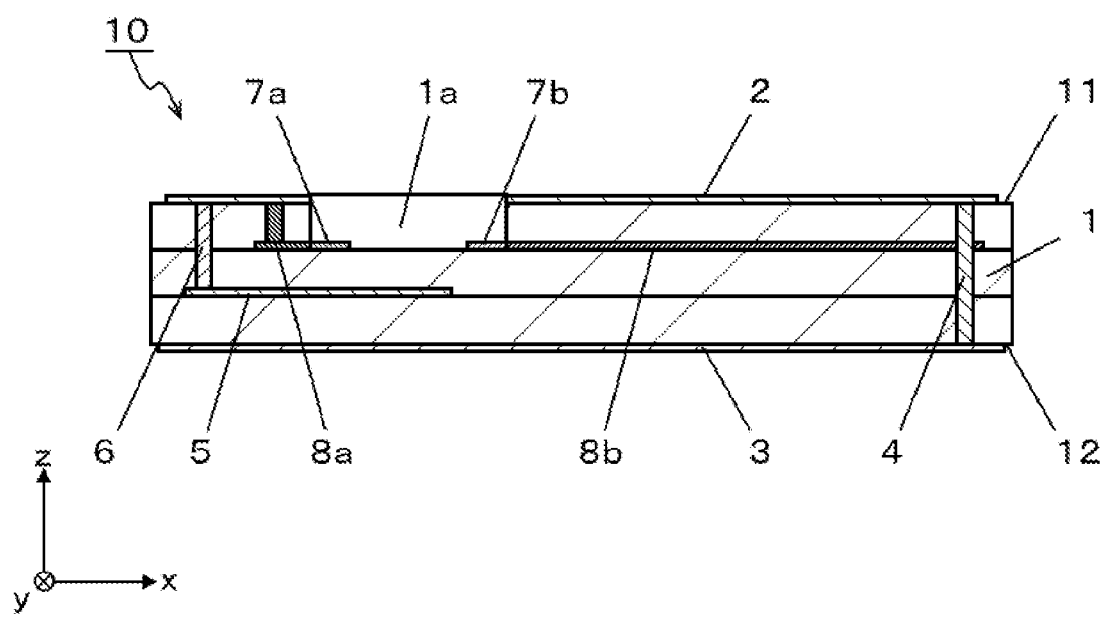
FIG. 21 is a cross-sectional view showing another example of the circuit board of the RFID tag shown in FIG. 2.
Figure 22:
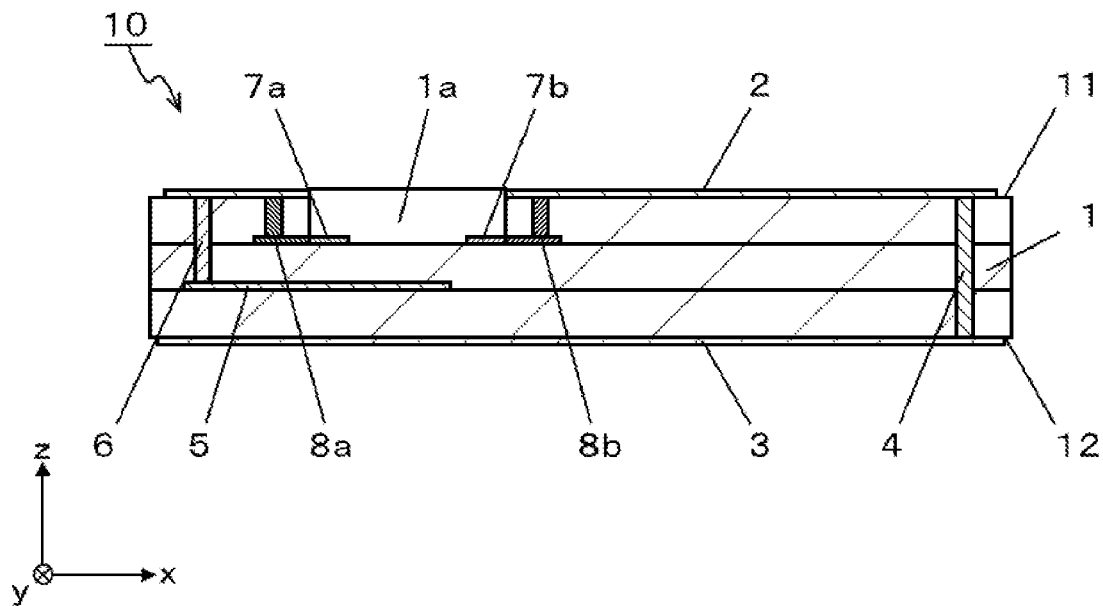
FIG. 22 is a cross-sectional view showing another example of the circuit board of the RFID tag shown in FIG. 2.

FIG. 20 to FIG. 22 are cross-sectional views showing other examples of the circuit board of the RFID tag shown in FIG. 2. In these examples, the capacitance conductor 5 same as that in the examples shown in FIG. 16 and FIG. 18 is present, but the form of the first connection conductor 8a or the second connection conductor 8b is different from that in the examples shown in FIG. 16 and FIG. 18.

In the circuit board 10 in the example shown in FIG. 20, the first connection conductor 8a is a through conductor that connects the first electrode 7a and the capacitance conductor 5. The first electrode 7a is connected by the first connection conductor 8a to the capacitance conductor 5 connected to the radiation conductor 2. The first electrode 7a is electrically connected to the radiation conductor 2 through the first connection conductor 8a, the capacitance conductor 5 and the capacitance part connection conductor 6. Hence, the wiring length from the power supply unit (the first electrode 7a) to the radiation conductor 2 is longer than that in the examples shown in FIG. 16 and FIG. 18. In the case of this configuration, because the capacitance conductor 5 is present as described above, the inverted-F antenna can be small. Further, because the wiring length of the electrical connection between the power supply unit and the radiation conductor 2 (antenna conductor) is long, wide bandwidth can be achieved without size increase of the external shape of the dielectric substrate 1. That is, this configuration is effective in making the circuit board 10, which is an antenna, broadband while keeping its small size. According to this circuit board 10, the circuit board 10, which can be provided, is effective in producing the RFID tags 100 that is small and easily achieves wide bandwidth.

In the examples shown in FIG. 16 and FIG. 18, the first electrode 7a is directly connected to the radiation conductor 2 by the first connection conductor 8a (not through the capacitance conductor 5 or the capacitance part connection conductor 6), namely with a relatively short connecting length. Hence, the electric path from the first electrode 7a to the second electrode 7b is shorter than that in the example shown in FIG. 20. More specifically, the electric path of the circuit board 10 in the example shown in FIG. 20 is from the first electrode 7a to the first connection conductor 8a, the capacitance conductor 5, the capacitance part connection conductor 6, the radiation conductor 2, the connection conductor 4, the ground conductor 3, the second connection conductor 8b, and then the second electrode 7b. In contrast, the electric path of the circuit board 10 in the examples shown in FIG. 16 and FIG. 18 is from the first electrode 7a to the first connection conductor 8a, the radiation conductor 2, the connection conductor 4, the ground conductor 3, the second connection conductor 8b, and then the second electrode 7b. Because the path from the first electrode 7a to the second electrode 7b is short, loss between the first electrode 7a and the second electrode 7b is small, so that the Q factor of this path can be high. Hence, the RFID tag 100 can be effective in efficient gain increase. According to this circuit board 10, as compared with the circuit board 10 in the example shown in FIG. 20, the circuit board 10, which can be provided, is effective in producing the RFID tag 100 that easily achieves high gain and so forth.

The circuit board 10 in the example shown in FIG. 21 has the electric path, which is from the first electrode 7a to the second electrode 7b, shorter than that of the circuit board 10 in the examples shown in FIG. 16 and FIG. 18. In the circuit board 10 in the example shown in FIG. 21, the second connection conductor 8b is a conductor layer between dielectric layers, and connects the second electrode 7b and the connection conductor 4. The second connection conductor 8b is integrated with the second electrode 7b, and can be regarded as the second electrode 7b extending from the recess 1a into the dielectric substrate 1 and connected to the connection conductor 4. The second electrode 7b is electrically connected to the radiation conductor 2 not through the ground conductor 3 or a portion of the connection conductor 4 on the ground conductor 3 side. The electric path of the circuit board 10 in the example shown in FIG. 21 is from the first electrode 7a to the first connection conductor 8a, the radiation conductor 2, (a portion of) the connection conductor 4 (on the radiation conductor 2 side from the second connection conductor 8b), the second connection conductor 8b, and then the second electrode 7b. This electric path, which is from the first electrode 7a to the second electrode 7b, is shorter than that of the circuit board 10 in the examples shown in FIG. 16 and FIG. 18 by the length of two through conductors (the second connection conductor 8b and the portion of the connection conductor 4 on the ground conductor 3 side) that penetrate two dielectric layers on the ground conductor 3 side in the dielectric substrate 1. Hence, loss between the first electrode 7a and the second electrode 7b is smaller, so that the Q factor of this path can be higher.

Hence, the circuit board 10, which can be provided, is effective in producing the RFID tag 100 that easily archives higher gain and so forth.

The circuit board 10 in the example shown in FIG. 22 has the electric path, which is from the first electrode 7a to the second electrode 7b, shorter than that of the circuit board 10 in the example shown in FIG. 21. In the circuit board 10 in the example shown in FIG. 22, the second connection conductor 8b is constituted by: a conductor layer 8b1 disposed between dielectric layers of the dielectric substrate 1 and connected to the second electrode 7b; and a through conductor 8b2 extending from the conductor layer 8b1 to the radiation conductor 2, penetrating a dielectric layer. The conductor layer 8b1 of the second connection conductor 8b is integrated with the second electrode 7b, and can be regarded as the second electrode 7b extending from the recess 1a into the dielectric substrate 1. The second electrode 7b is directly connected to the radiation conductor 2 by the second connection conductor 8b, not through the ground conductor 3 or the connection conductor 4. Hence, the electric path of the circuit board 10 in the example shown in FIG. 22 is a short path that is from the first electrode 7a to the first connection conductor 8a, the radiation conductor 2, the second connection conductor 8b, and then the second electrode 7b. Hence, loss between the first electrode 7a and the second electrode 7b is further smaller, so that the Q factor of this path can be further higher. Hence, the circuit board 10, which can be provided, is effective in producing the RFID tag 100 that easily achieves further higher gain and so forth.

The second connection conductor 8b having the configuration that makes the electric path from the first electrode 7a to the second electrode 7b short as in the examples shown in FIG. 21 and FIG. 22 is applicable to the circuit board 10 having no capacitance conductor 5 as in the examples shown in FIG. 5 and FIG. 7. In this case too, gain increase can be achieved.

Figure 23:
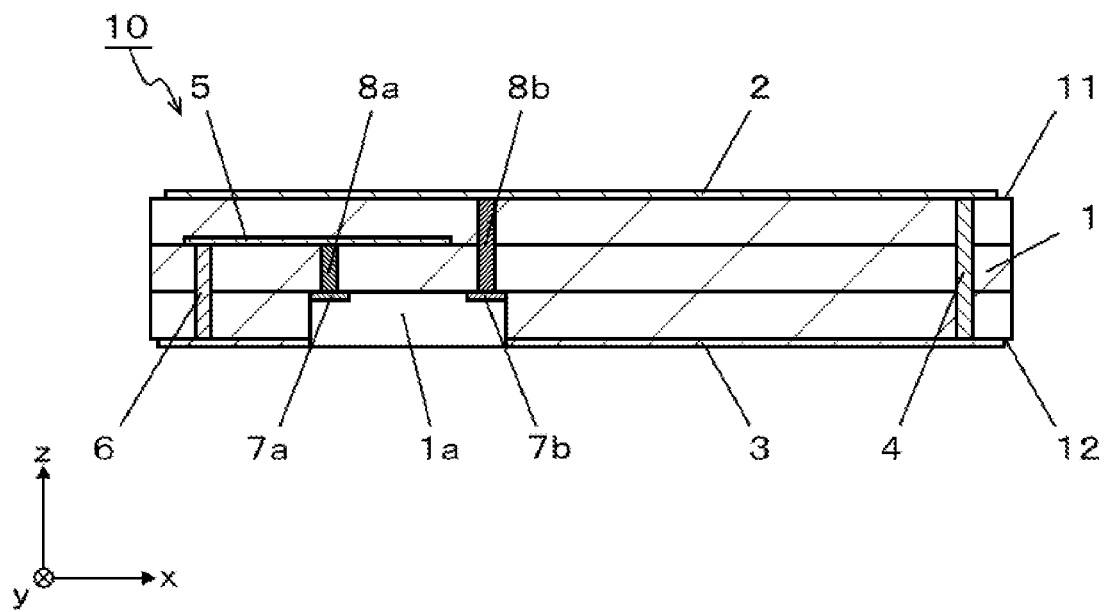
FIG. 23 is a cross-sectional view showing another example of the circuit board of the RFID tag shown in FIG. 3.
Figure 24:
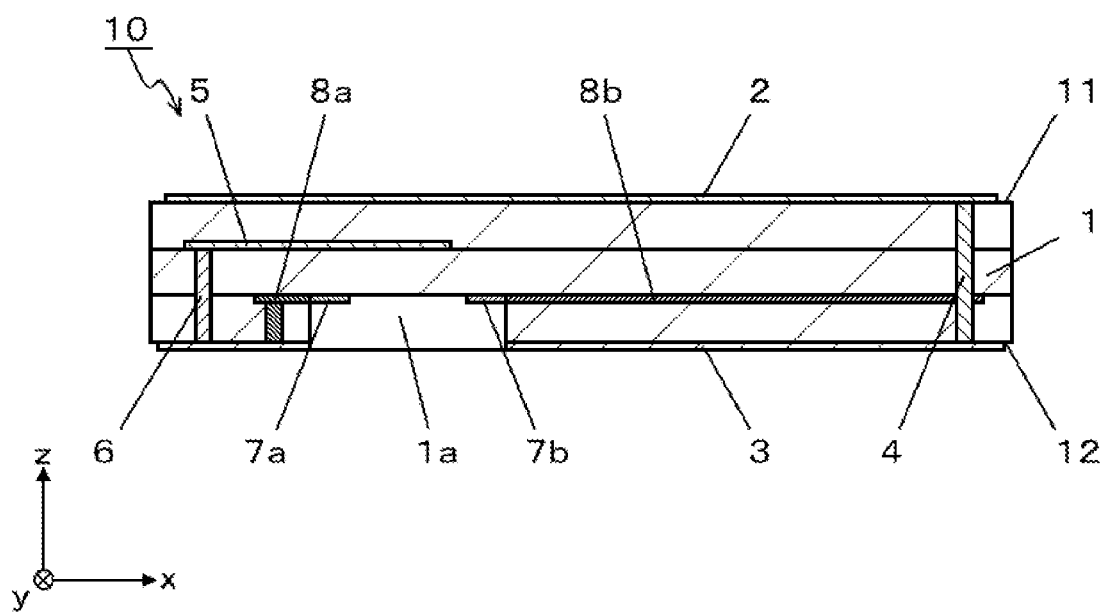
FIG. 24 is a cross-sectional view showing another example of the circuit board of the RFID tag shown in FIG. 3.
Figure 25:
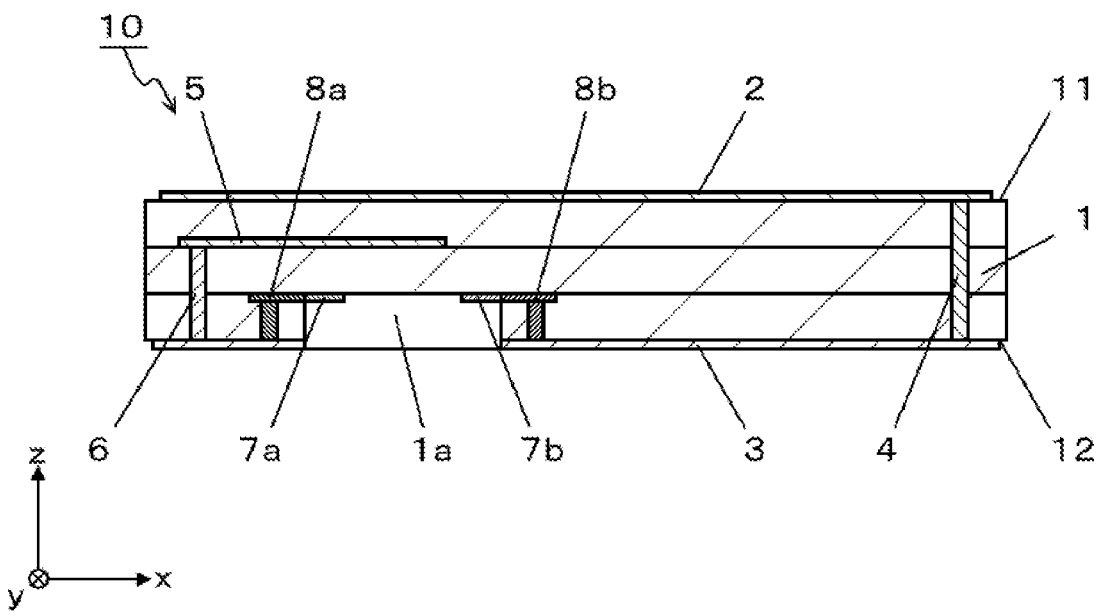
FIG. 25 is a cross-sectional view showing another example of the circuit board of the RFID tag shown in FIG. 3.

FIG. 23 to FIG. 25 are cross-sectional views showing other examples of the circuit board of the RFID tag shown in FIG. 3. In these examples, the capacitance conductor 5 same as that in the examples shown in FIG. 17 and FIG. 19 is present, but the form of the first connection conductor 8a or the second connection conductor 8b is different from that in the examples shown in FIG. 17 and FIG. 19.

In the circuit board 10 in the example shown in FIG. 23, the first connection conductor 8a is a through conductor that connects the first electrode 7a and the capacitance conductor 5. The first electrode 7a is connected by the first connection conductor 8a to the capacitance conductor 5 connected to the ground conductor 3. The first electrode 7a is electrically connected to the ground conductor through the first connection conductor 8a, the capacitance conductor 5 and the capacitance part connection conductor 6.

Figure 17:
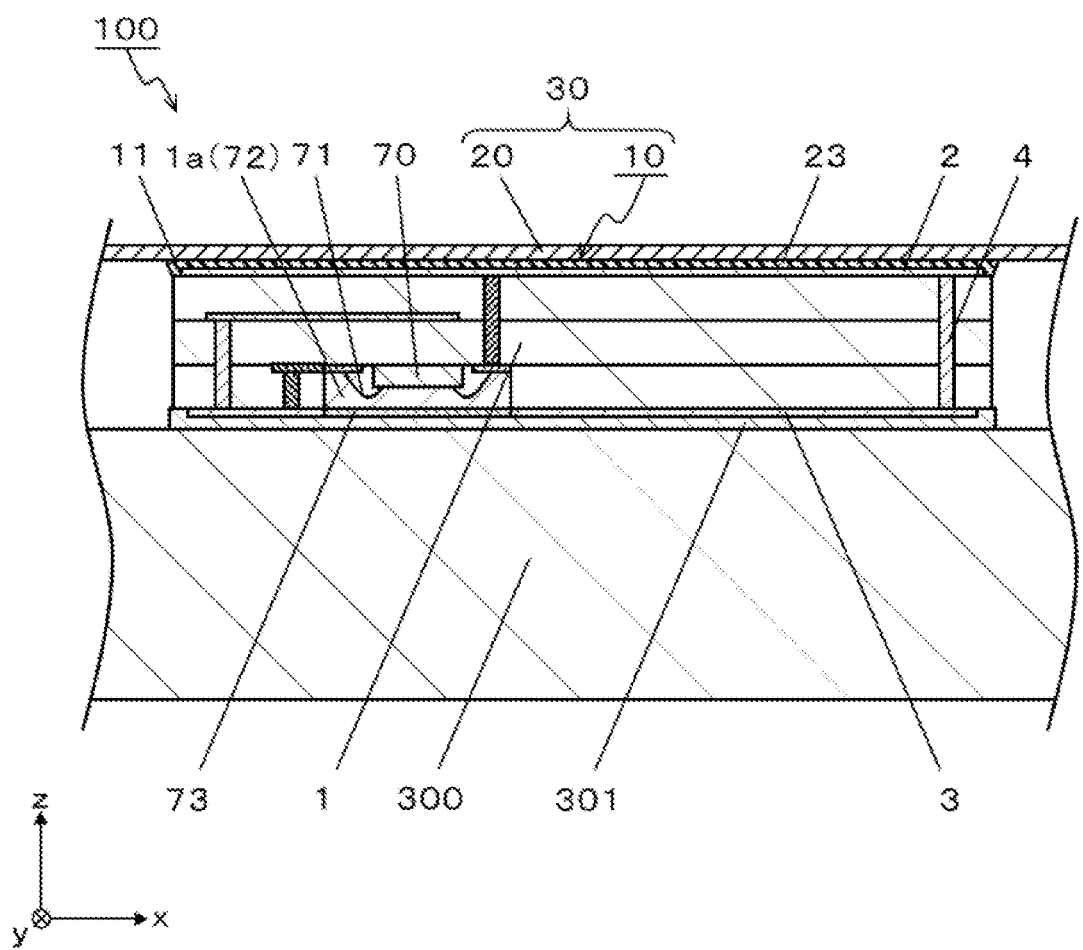
FIG. 17 is a cross-sectional view showing another example of the principle part of the RFID tag shown in FIG. 3.

Hence, the wiring length from the power supply unit (the first electrode 7a) to the radiation conductor 2 is longer than that in the examples shown in FIG. 17 and FIG. 19. In the case of this configuration, because the capacitance conductor 5 is present as described above, the inverted-F antenna can be small. Further, because the wiring length of the electrical connection between the power supply unit and the radiation conductor 2 (antenna conductor) is long, wide bandwidth can be achieved without size increase of the external shape of the dielectric substrate 1. That is, this configuration is effective in making the circuit board 10, which is an antenna, broadband while keeping its small size. According to this circuit board 10, the circuit board 10, which can be provided, is effective in producing the RFID tags 100 that is small and easily achieves wide bandwidth.

In the examples shown in FIG. 17 and FIG. 19, the first electrode 7a is directly connected to the ground conductor 3 by the first connection conductor 8a (not through the capacitance conductor 5 or the capacitance part connection conductor 6), namely with a relatively short connecting length. Hence, the electric path from the first electrode 7a to the second electrode 7b is shorter than that in the example shown in FIG. 23. More specifically, the electric path of the circuit board 10 in the example shown in FIG. 23 is from the first electrode 7a to the first connection conductor 8a, the capacitance conductor 5, the capacitance part connection conductor 6, the ground conductor 3, the connection conductor 4, the radiation conductor 2, the second connection conductor 8b, and then the second electrode 7b. In contrast, the electric path of the circuit board 10 in the examples shown in FIG. 17 and FIG. 19 is from the first electrode 7a to the first connection conductor 8a, the ground conductor 3, the connection conductor 4, the radiation conductor 2, the second connection conductor 8b, and then the second electrode 7b. Because the path from the first electrode 7a to the second electrode 7b is short, loss between the first electrode 7a and the second electrode 7b is small, so that the Q factor of this path can be high. Hence, the RFID tag 100 can be effective in efficient gain increase. According to this circuit board 10, as compared with the circuit board 10 in the example shown in FIG. 23, the circuit board 10, which can be provided, is effective in producing the RFID tag 100 that easily achieves high gain and so forth.

The circuit board 10 in the example shown in FIG. 24 has the electric path, which is from the first electrode 7a to the second electrode 7b, shorter than that of the circuit board 10 in the examples shown in FIG. 17 and FIG. 19. In the circuit board 10 in the example shown in FIG. 24, the second connection conductor 8b is a conductor layer between dielectric layers, and connects the second electrode 7b and the connection conductor 4. The second connection conductor 8b is integrated with the second electrode 7b, and can be regarded as the second electrode 7b extending from the recess 1a into the dielectric substrate 1 and connected to the connection conductor 4. The second electrode 7b is electrically connected to the ground conductor 3 not through the radiation conductor 2 or a portion of the connection conductor 4 on the radiation conductor 2 side from the second connection conductor 8b. The electric path of the circuit board 10 in the example shown in FIG. 24 is from the first electrode 7a to the first connection conductor 8a, the ground conductor 3, (a portion of) the connection conductor 4 (on the ground conductor 3 side from the second connection conductor 8b), the second connection conductor 8b, and then the second electrode 7b. This electric path, which is from the first electrode 7a to the second electrode 7b, is shorter than that of the circuit board 10 in the examples shown in FIG. 17 and FIG. 19 by the length of two through conductors (the second connection conductor 8b and the portion of the connection conductor 4 on the radiation conductor 2 side) that penetrate two dielectric layers on the radiation conductor 2 side in the dielectric substrate 1. Hence, loss between the first electrode 7a and the second electrode 7b is smaller, so that the Q factor of this path can be higher. Hence, the circuit board 10, which can be provided, is effective in producing the RFID tag 100 that easily archives higher gain and so forth.

The circuit board 10 in the example shown in FIG. 25 has the electric path, which is from the first electrode 7a to the second electrode 7b, shorter than that of the circuit board 10 in the example shown in FIG. 24. In the circuit board 10 in the example shown in FIG. 25, the second connection conductor 8b is constituted by: a conductor layer 8b1 disposed between dielectric layers of the dielectric substrate 1 and connected to the second electrode 7b; and a through conductor 8b2 extending from the conductor layer to the ground conductor 3, penetrating a dielectric layer. The conductor layer 8b1 of the second connection conductor 8b is integrated with the second electrode 7b, and can be regarded as the second electrode 7b extending from the recess 1a into the dielectric substrate 1. The second electrode 7b is directly connected to the ground conductor 3 by the second connection conductor 8b, not through the radiation conductor 2 or the connection conductor 4. Hence, the electric path of the circuit board 10 in the example shown in FIG. 25 is a short path that is from the first electrode 7a to the first connection conductor 8a, the ground conductor 3, the second connection conductor 8b, and then the second electrode 7b. Hence, loss between the first electrode 7a and the second electrode 7b is further smaller, so that the Q factor of this path can be further higher. Hence, the circuit board 10, which can be provided, is effective in producing the RFID tag 100 that easily achieves further higher gain and so forth.

The second connection conductor 8b having the configuration that makes the electric path from the first electrode 7a to the second electrode 7b short as in the examples shown in FIG. 24 and FIG. 25 is applicable to the circuit board 10 having no capacitance conductor 5 as in the examples shown in FIG. 6 and FIG. 8. In this case too, gain increase can be achieved.

Hereinafter, the RFID tag board 30 including the circuit board 10 and the radiation member 20 will be described in more detail.

The dielectric substrate 1 of the circuit board 10 functions as an electrically insulating base substrate for disposing the conductor parts, such as the radiation conductor 2 and the ground conductor 3, such that they are electrically insulated from one another. The dielectric substrate 1 also functions as a base substrate for mounting and fixing members, such as the semiconductor element 70.

The dielectric substrate 1 is, for example, a rectangular flat plate having a length of each side of 2 mm to 40 mm and a thickness of 0.3 mm to 3 mm. The dielectric substrate 1 has the recess 1a at a predetermined portion of the upper surface. As described above, the recess 1a is the portion where the semiconductor element 70 constituting the power supply unit is accommodated.

The dielectric substrate 1 is made of a ceramic sintered body, such as an aluminum oxide sintered body, an aluminum nitride sintered body, a mullite sintered body or a glass-ceramic sintered body. In the case of the dielectric substrate 1 made of a glass-ceramic sintered body, it can be produced by: first, mixing a raw material powder containing, as main components, powders of silicon oxide and boron oxide as glass components, a powder of aluminum oxide as a filler component, and/or the like with an organic solvent and a binder, thereby forming slurry; molding the slurry into sheets by a molding method, such as the doctor blade method or the lip coater method, thereby producing ceramic green sheets (which hereinafter may be referred to as green sheets) serving as dielectric layers of the dielectric substrate 1; next, stacking the green sheets on top of one another, thereby producing a layered body; and then firing the layered body at a temperature of about 900 to 1000° C., thereby producing the dielectric substrate 1.

Alternatively, the circuit board 10 including the dielectric substrate 1 may be produced as a multipiece wiring board where circuit board regions, which become circuit boards 10, are arranged on a mother board. A plurality of circuit boards 10 can be efficiently produced by dividing a mother board including a plurality of circuit board regions into the circuit board regions. In this case, grooves for dividing may be provided along boundaries between the circuit board regions in the mother board.

In the circuit board 10 of the RFID tag board 30 of the embodiment(s), dielectric layers (no reference signs) of fired ceramic green sheets are stacked on top of one another, thereby forming the dielectric substrate 1. The dielectric substrate 1 having the recess 1a may be produced by: punching the center portion or the like of some of ceramic green sheets in the thickness direction, thereby processing them into a frame shape; and firing the ceramic green sheets stacked with the frame-shaped ceramic green sheet(s) as the uppermost layer and/or the like. In this case, the dielectric substrate 1 is a layered body constituted by dielectric layers of fired ceramic green sheets being stacked on top of one another. In the examples shown in FIG. 5 to FIG. 8 and FIG. 14 to FIG. 25, the dielectric substrate 1 is constituted by three dielectric layers, but not limited thereto. Further, the recess 1a penetrates one dielectric layer, but may penetrate a plurality of layers.

The radiation conductor 2 is connected to the radiation member 20, and in the circuit board 10, is an antenna conductor that transmits and receives radio waves. The radiation conductor 2 is, for example, a rectangular conductor layer, which is the same as the dielectric substrate 1 in the external shape. When the recess 1a is provided in the first surface 11 (upper surface) of the dielectric substrate 1, the radiation conductor 2 is not provided over the recess 1a. Hence, the radiation conductor 2 is frame-shaped in plan view.

The ground conductor 3 too is a conductor constituting the inverted-F antenna together with the radiation conductor 2 and the connection conductor 4, and is a rectangular conductor layer, which is the same as the dielectric substrate 1 in the external shape. When the recess 1a is provided in the second surface 12 (lower surface) of the dielectric substrate 1, the ground conductor 3 is not provided over the recess 1a. Hence, the ground conductor 3 is frame-shaped in plan view. Further, making the outer dimensions of the ground conductor 3 one size larger than the outer dimensions of the radiation conductor 2 can prevent the coupling between these two from being unsteady due to positional deviation or the like during production of the circuit board 10.

The connection conductor 4 electrically connects the radiation conductor 2 and the ground conductor 3, and is a through conductor that penetrates the dielectric substrate 1 in the thickness direction. The connection conductor 4 may be a side conductor disposed on a lateral surface of the dielectric substrate 1. In the examples shown in FIG. 7 and FIG. 8, the connection conductor 4 is constituted by only one through conductor, but may be constituted by a plurality of through conductors as in the examples shown in FIG. 18 and FIG. 19. These through conductors are disposed, for example, next to one another at a portion of the peripheral portion of the radiation conductor. The connection conductor 4 constituted by a plurality of through conductors is advantageous, for example, for reducing conduction resistance of the connection conductor 4 and effectively stabilizing the ground potential.

Not only the connection conductor 4 but also other through conductors (the capacitance part connection conductor 6 and the through conductors of the first connection conductor 8a and the second connection conductor 8b) may each be constituted by two or more through conductors disposed next to one another. That is, for example, between the capacitance conductor 5 and the radiation conductor 2, two or more capacitance part connection conductors 6 may be disposed next to one another in plan view. In this case, they as a whole function in the same manner as one capacitance part connection conductor 6.

The capacitance conductor 5 has, as described above, the function of giving a predetermined capacitance to the antenna conductor. The "giving a predetermined capacitance to the antenna conductor" is, in other words, increasing the capacitance component between the radiation conductor 2 and the ground conductor 3. In order to increase the capacitance that is given by the capacitance conductor 5, the capacitance conductor 5 may face the conductor having no opening due to the recess 1a (the radiation conductor 2 or the ground conductor 3).

The facing area of the capacitance conductor 5 facing the radiation conductor 2 or the ground conductor 3 is better to be large in terms of size reduction, but better to be small in terms of gain increase. When these points, productivity as the RFID tag 100, and economical efficiency and so forth are taken into account, the capacitance conductor 5 and the radiation conductor 2 or the ground conductor 3 may be set so as to face one another in the range from about 10 to 90% of the area of the ground conductor 3 in plan view.

Figure 26:
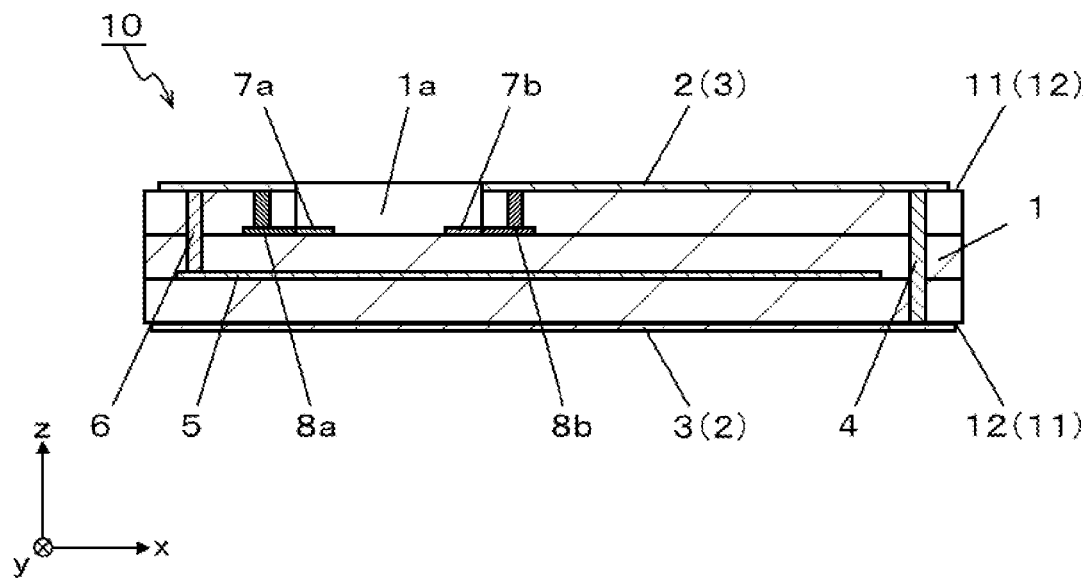
FIG. 26 is a cross-sectional view showing another example of the circuit board of the RFID tag.
Figure 27:
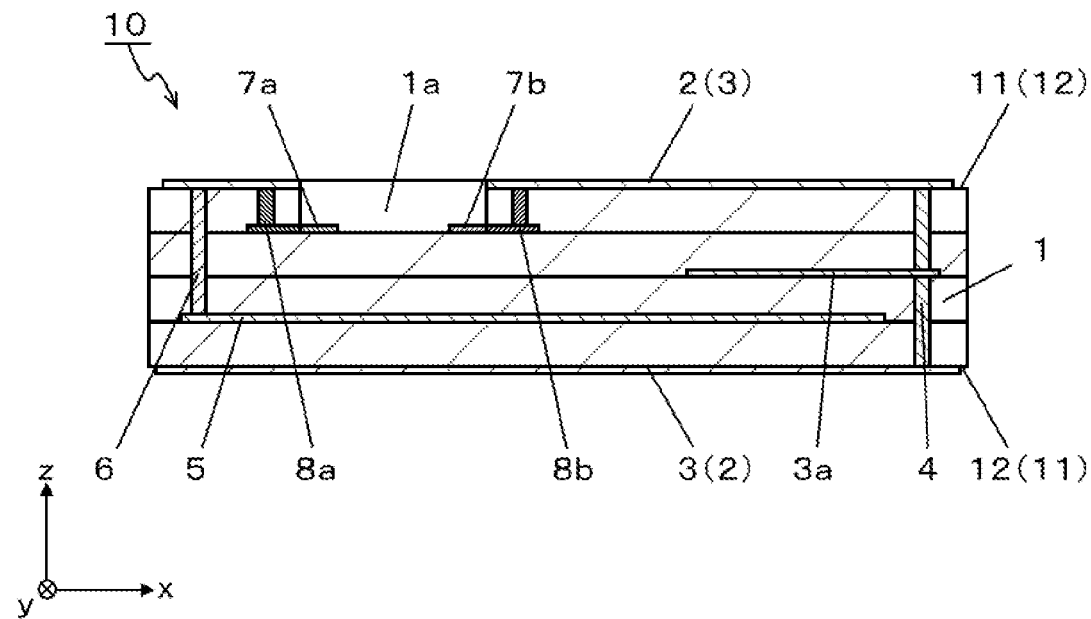
FIG. 27 is a cross-sectional view showing another example of the circuit board of the RFID tag.

FIG. 26 and FIG. 27 are cross-sectional views showing other examples of the circuit board of the RFID tag. In these examples, the recess 1a is provided in the first surface 11, and for size reduction, the facing area of the capacitance conductor 5 facing the ground conductor 3 is larger than that in the circuit board 10 in the example shown in FIG. 22. In the example shown in FIG. 26, the capacitance conductor 5 is extended toward the connection conductor 4 as compared with that of the circuit board 10 in the example shown in FIG. 22. In the example shown in FIG. 27, an internal ground conductor 3a is disposed between the capacitance conductor 5 and the radiation conductor 2. The internal ground conductor 3a is disposed so as to face the capacitance conductor 5, and is connected to the connection conductor 4. The capacitance component between the radiation conductor 2 and the ground conductor 3 increases by the facing area of the capacitance conductor 5 facing the internal ground conductor 3a. As compared with the example shown in FIG. 20, the size in plan view can be smaller. In this case, the gain decreases because the area of the radiation conductor 2 becomes small, but this gain decrease is suppressed by the above radiation member 20. This configuration of the capacitance conductor 5 is also applicable to the circuit board 10 in which the recess 1a is provided in the second surface 12. In the examples shown in FIG. 26 and FIG. 27, reference signs in the case of the recess 1a provided in the second surface are shown in parentheses. Further, in this case, about the orthogonal coordinate system xyz, the z direction and the y direction are each reversed.

When the circuit board 10 includes the capacitance conductor 5, more radio waves (electric field) are radiated from between the capacitance conductor 5 and a conductor facing the capacitance conductor 5 (the radiation conductor 2 or the ground conductor 3). The closer the portion from which radio waves (electric field) are radiated is to (the antenna conductor 21 of) the radiation member 20, the higher/stronger the coupling between the antenna of the circuit board 10 and the antenna conductor 21 of the radiation member 20 is. Hence, the circuit board 10 may include the capacitance conductor 5 facing the radiation conductor 2 on the first surface 11. This can produce the RFID tag 100 having high antenna gain.

The conductor parts, such as the radiation conductor 2, the ground conductor 3, the internal ground conductor 3a, the connection conductor 4, the capacitance conductor 5, the capacitance part connection conductor 6, the first electrode 7a, the second electrode 7b, the first connection conductor 8a and the second connection conductor 8b, are made of a metallic material(s). Examples of the metallic material include tungsten, molybdenum, manganese, copper, silver, palladium, gold, platinum, nickel and cobalt. The conductor parts may be made of an alloy material containing the above metallic material, for example. The metallic material or the like is disposed at predetermined portions of the dielectric substrate 1 as conductors exemplified by metallized conductors and plated conductors. These conductors include: layer-shaped conductors disposed on the exposed surfaces of dielectric layers or between dielectric layers; and columnar conductors fitted in through holes (no reference signs) and penetrating a dielectric layer(s) in the thickness direction.

When the dielectric substrate 1 is made of the abovementioned glass-ceramic sintered body, the conductor parts may be formed by, for example, metallized layers made of copper. The dielectric substrate 1 may be formed, for example, by a method of: printing metallic paste at predetermined positions on ceramic green sheets, which form the dielectric substrate 1, by screen printing or the like, the metallic paste being produced by mixing a cupper powder with an organic solvent and an organic binder; and then firing these simultaneously.

The conductor parts that penetrate the dielectric substrate 1 (dielectric layers) in the thickness direction, such as the connection conductor 4, may be formed by providing through holes in ceramic green sheets in advance, filling the through holes with the metal paste same as the above, and firing the ceramic green sheets. The through holes may be provided in the ceramic green sheets by mechanical drilling, laser processing or another method.

When the conductor parts are formed by metallized layers, the exposed surfaces of the metallized layers may be covered with plating layers in order to inhibit oxidation corrosion and improve characteristics, such as bonding property or the like of bonding wires 71 described later. Examples of the plating layers that cover the surfaces of the metallized layers include layers containing metal exemplified by nickel, cobalt, palladium and gold.

The radiation member 20 is connected to the circuit board 10, which is an antenna board, with the adhesive 23 and functions as a booster antenna as described above. The radiation member 20 includes the antenna conductor 21 that functions as an antenna. The antenna conductor 21 is a conductor made of metal, such as copper, brass or stainless steel. The radiation member 20 may be produced by processing a thin metallic plate into a predetermined shape by punching, etching or the like, or by processing a wire material made of the above metal into a predetermined shape.

The radiation member 20 may include the insulating member 22 as described above. The insulating member 22 may use resin, such as polyimide, polyethylene terephthalate or vinyl chloride. The radiation member 20 in the example shown in FIG. 10 may be produced by forming the antenna conductor 21 with a copper foil or the like on a substrate made of the above resin as the insulating member 22, namely may be produced by the same method as the method for producing flexible circuit boards. Alternatively, the radiation member 20 may be produced by forming a metallic film having a pattern shape of the antenna conductor 21 on the insulating member 22 by plating or vapor deposition. The radiation member 20 in the example shown in FIG. 11 may be produced by using, for example, a lead wire constituted by a copper wire as the antenna conductor 21 covered with vinyl chloride as the insulating member 22, or by using, what is called, an enamel wire using enamel as the insulating member 22 that covers the antenna conductor 21.

As the adhesive 23 for connecting the radiation member 20 and the circuit board 10, the following examples can be used: resin adhesives, such as epoxy resin; conductive bonding materials, such as silver paste (conductive adhesive) and solder; and double-sided tapes.

When the antenna conductor 21 of the radiation member 20 is exposed, the exposed surface may be covered with a plating layer made of the one appropriately selected from tin, nickel, cobalt, palladium, gold and so forth in order to inhibit oxidation corrosion and improve characteristics, such as connectivity to the circuit board 10 with solder described later.

When the recess 1a is provided in the first surface 11 of the circuit board 10, the radiation member 20 may be connected to the circuit board 10 so as to cover the opening of the recess 1a. Hence, the radiation member 20 is larger than the opening of the recess 1a. In this way, the power supply unit (the semiconductor element 70, the first electrode 7a and the second electrode 7b) in the recess 1a can be sealed.

Figure 28:
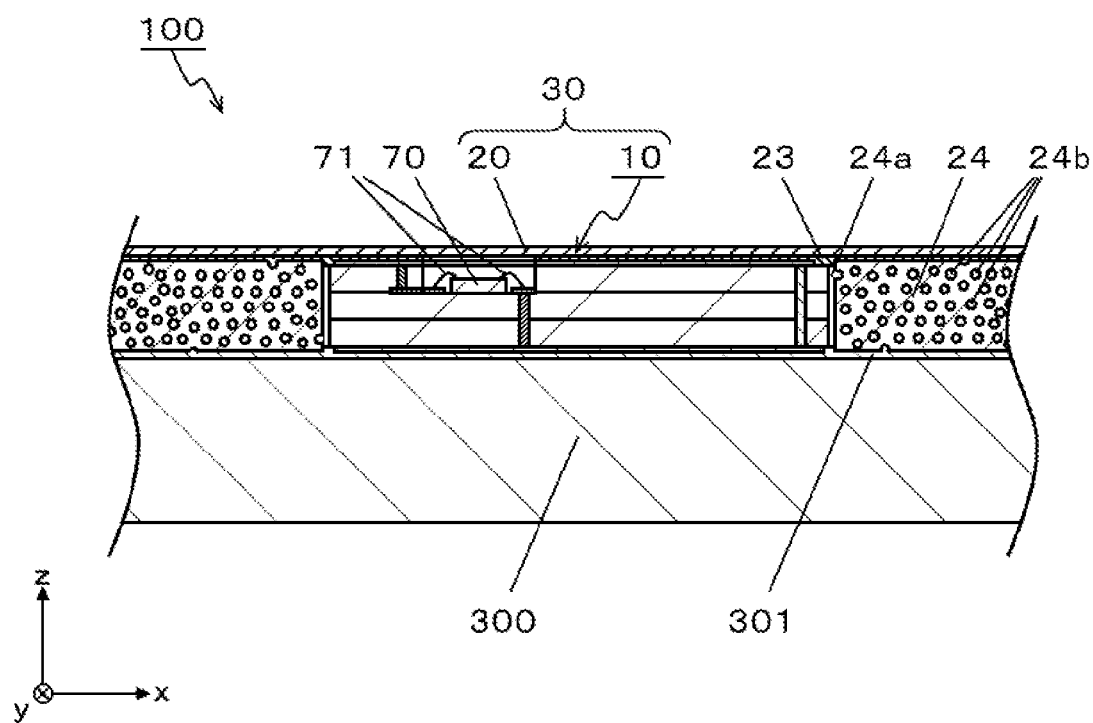
FIG. 28 is a cross-sectional view showing another example of the principle part of the RFID tag shown in FIG. 13.

The RFID tag board 30 and the RFID tag 100 may have the spacer (s) 24 as described above. The spacer 24 is made of an insulating material. In order to make the RFID tag 100 light, the spacer 24 made of, for example, resin, such as urethane or polyester, may be used. Resin having a smaller dielectric constant is better because the electromagnetic field generated between the radiation member 20 and the article 300 is less likely to be weakened by the spacer 24. As the spacer 24, the one same as or similar to the insulating member 22 of the radiation member 20 may be used. In order to make the dielectric constant of the spacer 24 smaller, the spacer 24 containing air bubbles (air) 24b as in the example shown in FIG. 28 can be used, for example. FIG. 28 is a cross-sectional view showing another example of the principle part of the RFID tag shown in FIG. 13. Examples of the material containing air bubbles include urethane foam. In this case, the spacer 24 and, by extension, the RFID tag 100 are lighter.

Figure 29:
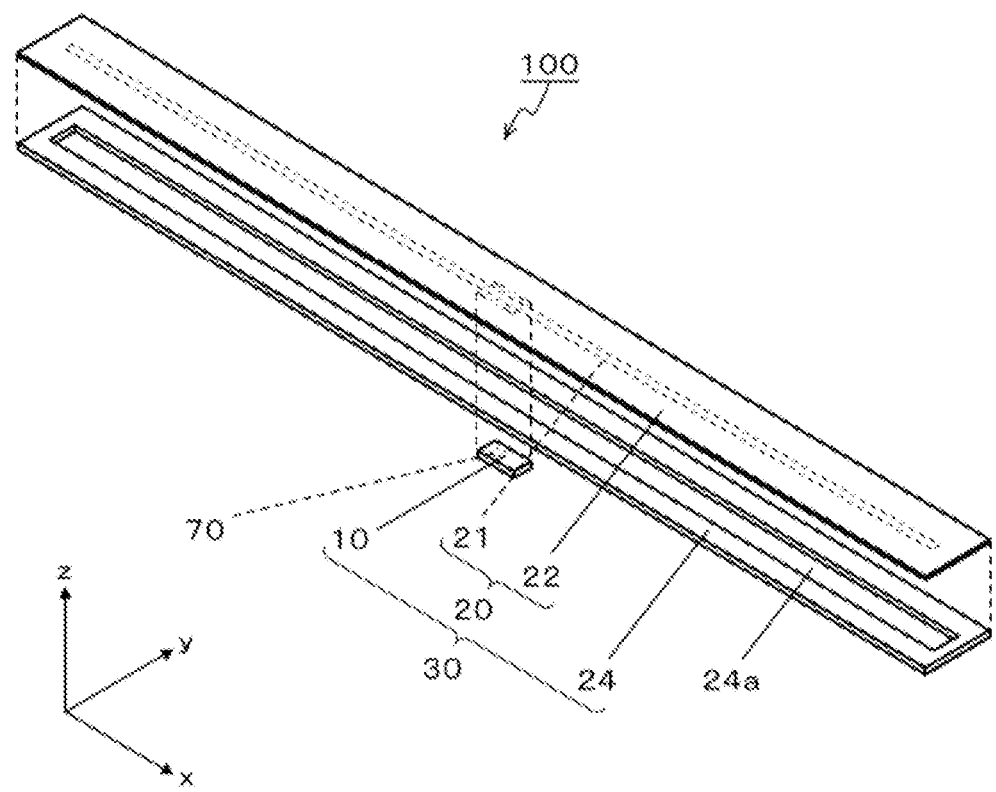
FIG. 29 is an exploded perspective view showing another example of the RFID tag board and the RFID tag.

When the spacers 24 in the example shown in FIG. 12 are compared with the spacer 24 in the example shown in FIG. 13, the spacers 24 shown in FIG. 12 are smaller, and space is formed between (the antenna conductor 21 of) the radiation member 20 and the article 300. Because the space is usually air, the dielectric constant between (the antenna conductor 21 of) the radiation member 20 and the article 300 is small. FIG. 29 is an exploded perspective view showing another example of the RFID tag board and the RFID tag. The spacer 24 in the example shown in FIG. 29 has the through hole 24a as with the spacer 24 in the example shown in FIG. 13, but its size is larger than that of the through hole 24a of the spacer 24 shown in FIG. 13. The through hole 24a in this example has a shape of the through hole 24a in the example shown in FIG. 13 extended in the x direction of the orthogonal coordinate system, and is larger than the antenna conductor 21 of the radiation member 20 in plan perspective. Further, in plan perspective, the antenna conductor 21 is located in the through hole 24a. Hence, between the antenna conductor 21 of the radiation member 20 and the article 300, space is formed over the entire area. Consequently, the coupling between the circuit board 10 and the antenna conductor 21 further increases, so that the antenna gain of the RFID tag 100 further increases. In this example too, the circuit board 10 equipped with the semiconductor element 70 is surrounded by the radiation member 20 and the spacer 24, thereby not being exposed. This improves protectiveness for the semiconductor element 70 and the circuit board 10.

The spacer 24 is, as described above, bonded to the surface (lower surface) of the radiation member 20, the surface being connected to the circuit board 10, with the adhesive 23 for connecting the radiation member 20 and the circuit board 10. A bonding material different from the adhesive 23 may be used.

The RFID tag 100 includes the above RFID tag board 30 and the semiconductor element 70 that is electrically connected to the first electrode 7a and the second electrode 7b of (the circuit board 10 of) the RFID tag board 30. The RFID tag according to an aspect of the present disclosure includes the RFID tag board 30 having the above configuration and improved antenna characteristics. Hence, the RFID tag is small, excellent in communication characteristics, such as communication distance, and excellent in information communication reliability.

The semiconductor element 70 is fixed to the bottom surface of the recess 1a with a bonding material (not shown). As the bonding material, for example, a brazing material having a low melting point, such as gold-silicon (Au—Si) brazing material, a glass composite material or a resin adhesive can be used.

In the examples shown in FIG. 2, FIG. 3, FIG. 5, FIG. 6, FIG. 14 to FIG. 17 and FIG. 28, terminals (not shown) of the semiconductor element 70 are electrically connected to the first electrode 7a and the second electrode 7b through the bonding wires 71. The electrical connection between the terminals of the semiconductor element 70 and the first and second electrodes 7a, 7b is not limited to being achieved by the above manner, but may be achieved, for example, by flip chip connection using solder balls, bumps made of metal, such as gold, or the like.

The power supply unit accommodated in the recess 1a may be sealed with a sealing resin 72 as in the examples shown in FIG. 16 and FIG. 17. As in the example shown in FIG. 16, when the recess 1a is provided in the first surface 11 of the circuit board 10 and filled with the sealing resin 72, the upper surface of the sealing resin 72 and the radiation member 20 may be bonded with the adhesive 23. In this case, over the recess 1a, the radiation member 20 and the circuit board 10 are bonded through the sealing resin 72. This increases the bonding area of the radiation member 20 and the circuit board 10, and hence improves bonding reliability of the radiation member 20 and sealing reliability of the semiconductor element 70.

Further, as in the example shown in FIG. 17, when the recess 1a is provided in the second surface 12 of the circuit board 10, the conductive lid 73 is easy to bond. When the conductive lid 73 and the ground conductor 3 of the circuit board 10 are electrically connected by using conductive resin, the conductive resin can also be provided on the surface of the sealing resin 72. Hence, bonding of the conductive lid 73 also becomes strong. Usable examples of the conductive lid 73 include: a metallic plate that is a conductive plate-like body; and a lid constituted by a conductive film made of metal on an insulating substrate made of resin, ceramics or the like. Alternatively, the conductive lid 73 may be formed by providing the conductive resin from the ground conductor 3 to the surface of the sealing resin.

As the sealing resin 72, the following examples can be cited: epoxy resin; polyimide resin; and silicone resin. To these resin materials, filler particles, such as silica particles or glass particles, may be added. The filler particles are added thereto in order to adjust various characteristics, such as mechanical strength, moisture resistance and electrical characteristics of the sealing resin 72, for example. The material of the sealing resin 72 is appropriately selected and used from the various resin materials in accordance with conditions, such as workability (productivity) during production of the RFID tag 100, economical efficiency and so forth.

FIG. 4 is a schematic view showing the RFID system, and contains a perspective view of the RFID tag and a perspective view of the reader/writer. FIG. 4 shows the RFID tag 100 mounted on the article 300. The RFID system 600 includes the RFID tag 100 having the above configuration and the reader/writer 200 having the antenna 201 that transmits and receives radio waves to and from the radiation conductor 2 of the RFID tag 100. The RFID tag 100 is fixed to the article 300 with the bonding material 301.

Because this RFID system 600 includes the RFID tag 100 having the above configuration, the RFID system 600, which can be provided, is excellent in communication characteristics between the RFID tag 100 and the reader/writer 200, and achieves easy transmission and reception of information between the article 300 and the reader/writer 200.

The reader/writer 200 is formed by disposing the antenna 201 on a base substrate made of, for example, an electrically insulating material. The base substrate is a housing where the antenna 201 is accommodated. In the housing, a circuit connected to the antenna 201 is disposed. The base substrate may be provided with, for example, a display and an input unit that are connected to the circuit. The display displays information of the RFID tag 100 or the like. The input unit is, for example, for rewriting information.

The article 300, on which the RFID tag 100 is mounted, is an article that requires its usage history/record or the like when used. Examples of the article 300 include implements, such as jigs or tools used for various types of industrial processing, such as machining, metal processing and resin processing. The implements also include consumable implements, such as cutting tools and abrasive tools. Not only tools for industrial use but also articles for daily and household use, agricultural products, various prepaid cards for transportation and so forth and medical instruments are included in the article 300.

The RFID tag 100 is mounted on the article 300, for example, such that the ground conductor 3 of the circuit board 10 grounds on a metallic portion of the article 300. This mounting form allows the metallic portion of the article 300 to serve as a ground conductor for the antenna (the inverted-F antenna) of the RFID tag 100 too. This improves the antenna gain and can expand the communication area of the RFID tag 100. That is, the RFID system. 600, which can be formed, is advantageous, for example, for making the distance to transmit and receive information between the article 300 and the reader/writer 200 long.

In other words, according to the RFID system 600 including the RFID tag 100 of the above embodiment(s), the RFID system 600, which can be configured, archives excellent transmission and reception of radio waves between the antenna 201 of the reader/writer 200 and the article 300 including the metallic portion, even when the article 300 is the metallic article 300, such as a die or a tool for cutting exemplified by scissors. That is, the possibility can be reduced that the transmission and reception may be hindered by electromagnetic induction due to an article (metal). Hence, the RFID system, which can be configured, archives, for example, easy simultaneous transmission or reception of pieces of information (radio waves) between metallic articles 300 and the reader/writer 200, and has efficiently improved practicality.

As the bonding material 301 for fixing the RFID tag 100 to the article 300, the following examples can be cited: resin adhesives, such as epoxy resin; conductive bonding materials, such as silver paste and solder; and double-sided tapes.

REFERENCE SIGNS LIST

1 Dielectric Substrate
1a Recess
11 First Surface
2 Second Surface
3 Radiation Conductor
3 Ground Conductor
3a Internal Ground Conductor
4 Connection Conductor
5 Capacitance Conductor
6 Capacitance Part Connection Conductor
7a First Electrode
7b Second Electrode
8a First Connection Conductor
8b Second Connection Conductor
10 Circuit Board
20 Radiation Member
21 Antenna Conductor
22 Insulating Member
23 Adhesive
24 Spacer
24a Through Hole
30 RFID Tag Board
70 Semiconductor Element
71 Wire
72 Sealing Resin
73 Conductive Lid
100 RFID Tag
200 Reader/Writer
201 Antenna
300 Article
301 Bonding Material
600 RFID System

The invention claimed is:
1. An RFID tag board comprising:
a circuit board including:
    a dielectric substrate including: a first surface; a second surface opposite to the first surface, the second surface being a mounting surface to be mounted on an article; and a recess;
    a radiation conductor on the first surface of the dielectric substrate;
    a ground conductor on the second surface of the dielectric substrate;
    a connection conductor electrically connecting the radiation conductor and the ground conductor; and
    a first electrode and a second electrode in the recess; and
a radiation member fixed to the first surface of the circuit board,
wherein the circuit board further includes:

a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor.

2. The RFID tag board according to claim 1, wherein the radiation member includes an antenna conductor and an insulating member.

3. The RFID tag board according to claim 2,
wherein the radiation member includes a portion protruding from the circuit board in plan view, and
wherein the RFID tag board further comprises a spacer bonded to the portion of the radiation member protruding from the circuit board, thereby being located on a side of the circuit board.

4. The RFID tag board according to claim 3, wherein the circuit board further includes:
a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor.

5. The RFID tag board according to claim 2, wherein the circuit board further includes:
a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor.

6. The RFID tag board according to claim 1,
wherein the radiation member includes a portion protruding from the circuit board in plan view, and
wherein the RFID tag board further comprises a spacer bonded to the portion of the radiation member protruding from the circuit board, thereby being located on a side of the circuit board.

7. The RFID tag board according to claim 6,
wherein the spacer is plate-like and has a through hole, and
wherein the circuit board is disposed in the through hole.

8. The RFID tag board according to claim 7, wherein the circuit board further includes:
a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor.

9. The RFID tag board according to claim 6, wherein the circuit board further includes:
a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor.

10. An RFID tag comprising:
an RFID tag board comprising:
a circuit board including:
a dielectric substrate including: a first surface; a second surface opposite to the first surface, the second surface being a mounting surface to be mounted on an article; and a recess;
a radiation conductor on the first surface of the dielectric substrate;
a ground conductor on the second surface of the dielectric substrate;
a connection conductor electrically connecting the radiation conductor and the ground conductor; and
a first electrode and a second electrode in the recess; and
a radiation member fixed to the first surface of the circuit board,
wherein the circuit board further includes:
a capacitance conductor inside the dielectric substrate, the capacitance conductor facing a portion of the ground conductor or the radiation conductor; and
a capacitance part connection conductor electrically connecting the capacitance conductor and the radiation conductor or the capacitance conductor and the ground conductor; and
a semiconductor element mounted in the recess of the circuit board of the RFID tag board and connected to the first electrode and the second electrode.

11. An RFID tag according to claim 10,
wherein the radiation member includes an antenna conductor and an insulating member.

12. An RFID tag according to claim 11,
wherein the radiation member includes a portion protruding from the circuit board in plan view, and
wherein the RFID tag board further comprises a spacer bonded to the portion of the radiation member protruding from the circuit board, thereby being located on a side of the circuit board.

13. An RFID tag according to claim 10,
wherein the radiation member includes a portion protruding from the circuit board in plan view, and
wherein the RFID tag board further comprises a spacer bonded to the portion of the radiation member protruding from the circuit board, thereby being located on a side of the circuit board.

14. An RFID tag according to claim 13,
wherein the spacer is plate-like and has a through hole, and
wherein the circuit board is disposed in the through hole.

15. An RFID system comprising:
an RFID tag comprising:
an RFID tag board comprising:
a circuit board including:
a dielectric substrate including: a first surface; a second surface opposite to the first surface, the second surface being a mounting surface to be mounted on an article; and a recess;
a radiation conductor on the first surface of the dielectric substrate;
a ground conductor on the second surface of the dielectric substrate;
a connection conductor electrically connecting the radiation conductor and the ground conductor; and
a first electrode and a second electrode in the recess; and
a radiation member fixed to the first surface of the circuit board,
wherein the circuit board further includes:

a capacitance conductor inside the dielectric substrate, the capacitance conductor facing a portion of the ground conductor or the radiation conductor; and a capacitance part connection conductor electrically connecting the capacitance conductor and the radiation conductor or the capacitance conductor and the ground conductor;

a semiconductor element mounted in the recess of the circuit board of the RFID tag board and connected to the first electrode and the second electrode; and a reader/writer including an antenna transmitting and receiving a radio wave to and from the RFID tag.

\* \* \* \* \*